US011873567B2

(12) United States Patent
Lewis

(10) Patent No.: US 11,873,567 B2
(45) Date of Patent: *Jan. 16, 2024

(54) SYSTEM FOR MANAGING FUEL GENERATION

(71) Applicant: H2U Technologies, Inc., Chatsworth, CA (US)

(72) Inventor: Nathan Saul Lewis, La Canada Flintridge, CA (US)

(73) Assignee: H2U Technologies, Inc., Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,086

(22) Filed: Dec. 16, 2022

(65) Prior Publication Data

US 2023/0122095 A1  Apr. 20, 2023

Related U.S. Application Data

(63) Continuation of application No. 17/827,375, filed on May 27, 2022, now Pat. No. 11,613,818, which is a
(Continued)

(51) Int. Cl.
*C25B 11/02* (2021.01)
*C25B 13/02* (2006.01)
*C25B 15/02* (2021.01)
*C25B 9/015* (2021.01)
*C25B 9/23* (2021.01)
(Continued)

(52) U.S. Cl.
CPC ............ *C25B 9/15* (2021.01); *C25B 1/04* (2013.01); *C25B 9/015* (2021.01); *C25B 9/19* (2021.01); *C25B 9/23* (2021.01); *C25B 9/65* (2021.01); *C25B 9/70* (2021.01); *C25B 11/02* (2013.01); *C25B 13/02* (2013.01); *C25B 15/02* (2013.01)

(58) Field of Classification Search
CPC .. C25B 9/015; C25B 9/23; C25B 1/34; C25B 1/46
USPC .......................................... 204/253, 260, 248
See application file for complete search history.

(56) References Cited

U.S. PATENT DOCUMENTS 1,477,629 A   12/1923  Chrisman
1,982,224 A   11/1934  Michel
(Continued)

FOREIGN PATENT DOCUMENTS

EP           2 377 971 A1   10/2011
WO    WO-2009/032413 A1    3/2009
(Continued)

OTHER PUBLICATIONS

Ebrary.net (2022). "Flat tubular SOECs design," Fundamentals of Technologies, 6 total pages.
(Continued)

*Primary Examiner* — Harry D Wilkins, III
(74) *Attorney, Agent, or Firm* — Cooley LLP

(57) ABSTRACT

An electrolyzer has an electrolytic cell with a membrane that surrounds an interior channel. The electrolytic cell also has a first electrode positioned in the interior channel such that the membrane surrounds the first electrode. The electrolytic cell also includes a second electrode positioned such that the membrane is located between the first electrode and the second electrode.

27 Claims, 9 Drawing Sheets

Related U.S. Application Data continuation of application No. 17/460,025, filed on Aug. 27, 2021.

(60) Provisional application No. 63/070,956, filed on Aug. 27, 2020.

(51) Int. Cl.
  *C25B 9/15* (2021.01)
  *C25B 9/19* (2021.01)
  *C25B 1/04* (2021.01)
  *C25B 9/70* (2021.01)
  *C25B 9/65* (2021.01)

(56) References Cited

U.S. PATENT DOCUMENTS

| | | | |
|---|---|---|---|
| 2,361,974 A * | 11/1944 | Smith | C25B 9/19 204/260 |
| 3,812,026 A | 5/1974 | Bertrand et al. | |
| 3,933,614 A | 1/1976 | Bunn, Jr. | |
| 4,177,116 A | 12/1979 | Denora et al. | |
| 4,204,922 A | 5/1980 | Fraser et al. | |
| 4,315,805 A * | 2/1982 | Darlington | C08J 5/2237 205/512 |
| 4,329,435 A * | 5/1982 | Kimoto | C08F 214/08 521/38 |
| 4,374,014 A | 2/1983 | Smith et al. | |
| 4,402,809 A | 9/1983 | Dilmore et al. | |
| 4,784,735 A * | 11/1988 | Sorenson | C25B 1/46 204/263 |
| 7,510,633 B2 | 3/2009 | Shimko et al. | |
| 7,837,842 B1 | 11/2010 | Mayers, Sr. et al. | |
| 7,910,461 B2 | 3/2011 | Spurgeon et al. | |
| 8,075,750 B2 | 12/2011 | McAlister | |
| 8,110,898 B2 | 2/2012 | Lewis et al. | |
| 8,222,123 B2 | 7/2012 | Spurgeon et al. | |
| 8,455,333 B2 | 6/2013 | Spurgeon et al. | |
| 8,530,338 B2 | 9/2013 | Kayes et al. | |
| 8,540,856 B1 | 9/2013 | Mayers, Sr. et al. | |
| 8,809,843 B2 | 8/2014 | McKone et al. | |
| 9,048,097 B2 | 6/2015 | Warren et al. | |
| 9,126,175 B2 | 9/2015 | Lewis et al. | |
| 9,340,885 B1 | 5/2016 | Koeneman et al. | |
| 9,435,043 B2 | 9/2016 | Haber et al. | |
| 9,476,129 B2 | 10/2016 | Lewis et al. | |
| 9,530,912 B2 | 12/2016 | Putnam et al. | |
| 9,540,741 B2 | 1/2017 | Ardo et al. | |
| 9,545,612 B2 | 1/2017 | Lewis et al. | |
| 9,645,108 B2 | 5/2017 | Jin et al. | |
| 9,645,109 B2 | 5/2017 | Jin et al. | |
| 9,778,234 B2 | 10/2017 | Gregoire et al. | |
| 9,947,816 B2 | 4/2018 | Ardo et al. | |
| 9,976,220 B2 | 5/2018 | Hu et al. | |
| 10,026,560 B2 | 7/2018 | Lewis et al. | |
| 10,090,425 B2 | 10/2018 | Lewis et al. | |
| 10,242,806 B2 | 3/2019 | Lewis et al. | |
| 10,344,387 B2 | 7/2019 | Lewis et al. | |
| 10,598,644 B2 | 3/2020 | Gregoire et al. | |
| 10,787,749 B2 | 9/2020 | Xiang et al. | |
| 11,047,054 B2 | 6/2021 | Gregoire et al. | |
| 11,613,818 B2 | 3/2023 | Lewis | |
| 2001/0050234 A1 | 12/2001 | Shiepe | |
| 2007/0051633 A1 | 3/2007 | Meyer et al. | |
| 2007/0205097 A1 | 9/2007 | Schaefer | |
| 2009/0020150 A1 | 1/2009 | Atwater et al. | |
| 2009/0078568 A1 | 3/2009 | Ramaswami et al. | |
| 2009/0127128 A1 | 5/2009 | Kitaori et al. | |
| 2010/0086824 A1 | 4/2010 | Homel et al. | |
| 2013/0008775 A1 | 1/2013 | Ahmed et al. | |
| 2013/0092549 A1 | 4/2013 | Spurgeon et al. | |
| 2014/0021034 A1 | 1/2014 | Lewis et al. | |
| 2014/0284209 A1 | 9/2014 | Gilman | |
| 2015/0021193 A1 | 1/2015 | Verfußet al. | |
| 2017/0226648 A1 | 8/2017 | Zhao et al. | |
| 2019/0013426 A1 | 1/2019 | Lewis et al. | |
| 2019/0264338 A1 | 8/2019 | Karp et al. | |
| 2020/0188898 A1 | 6/2020 | Lewis et al. | |
| 2020/0378016 A1 | 12/2020 | Xiang et al. | |
| 2021/0020975 A1 | 1/2021 | Seymour et al. | |
| 2022/0056601 A1 | 2/2022 | Gregoire et al. | |
| 2022/0064807 A1 * | 3/2022 | Lewis | C25B 9/015 |
| 2022/0290316 A1 * | 9/2022 | Lewis | C25B 13/02 |

FOREIGN PATENT DOCUMENTS

| | | | |
|---|---|---|---|
| WO | WO-2012166997 A2 * | 12/2012 | C01B 11/06 |
| WO | WO-2013/106793 A1 | 7/2013 | |
| WO | WO-2013/181629 A1 | 12/2013 | |
| WO | WO-2014/015325 A1 | 1/2014 | |
| WO | WO-2014/039798 A1 | 3/2014 | |
| WO | WO-2015/054656 A1 | 4/2015 | |
| WO | WO-2018/195349 A1 | 10/2018 | |
| WO | WO-2020/131957 A1 | 6/2020 | |
| WO | WO-2022/047239 A1 | 3/2022 | |

OTHER PUBLICATIONS

Guo et al, A novel tubular microbial electrolysis cell for high rate hydrogen production, Journal of Power Sources, vol. 356, Jul. 2017, pp. 484-490 (Year: 2017).

International Search Report dated Feb. 7, 2022, for PCT Application No. PCT/US2021/048069, filed on Aug. 27, 2021, 4 pages.

Laube, A. et al. (2022). "Tubular membrane electrode assembly for PEM electrolysis," Int'l Journal of Hydrogen Energy 47:15943-15951.

Merida, W.R. et al. (2001). "Non-planar architecture for proton exchange membrane fuel cells," Journal of Power Sources 102:178-185.

Moreno-Hernandez et al, Crystalline nickel manganese antimonate as a stable water-oxidation catalyst in aqueous 1.0 M H2SO4, Energy & Environmental Science, vol. 10, No. 10, Aug. 2017, pp. 2103-2108.

Non-Final Office Action dated Aug. 17, 2022, for U.S. Appl. No. 17/460,025, filed Aug. 27, 2021, 13 pages.

Non-Final Office Action dated Aug. 17, 2022, for U.S. Appl. No. 17/827,375, filed May 27, 2022, 16 pages.

Notice of Allowance dated Dec. 7, 2022, for U.S. Appl. No. 17/827,375, filed May 27, 2022, 7 pages.

Written Opinion of the International Searching Authority dated Feb. 7, 2022, for PCT Application No. PCT/US2021/048069, filed on Aug. 27, 2021, 6 pages.

Final Office Action dated Jan. 3, 2023, for U.S. Appl. No. 17/460,025, filed Aug. 27, 2021, 13 pages.

Notice of Allowance dated Aug. 7, 2023, for U.S. Appl. No. 17/460,025, filed Aug. 27, 2021, 9 pages.

* cited by examiner

SYSTEM FOR MANAGING FUEL GENERATION

CROSS REFERENCE TO RELATED APPLICATIONS

This Application is a continuation of U.S. application Ser. No. 17/827,375, filed May 27, 2022, that is a continuation of U.S. application Ser. No. 17/460,025, filed Aug. 27, 2021, which claims the benefit of U.S. Provisional Patent Application Ser. No. 63/070,956, filed Aug. 27, 2020 and incorporated herein in their entirety.

FIELD OF THE INVENTION

The disclosure relates to electrolysis systems and devices, and more particularly, to compartmentalized systems and devices having varying geometries.

BACKGROUND

Renewable energy sources such as wind and solar are problematic because of their performance varies with uncontrollable factors such as weather and time of day. There is a need for systems that can convert the variable energy produced by these systems to a form of energy that is accessible whenever desired by the end-user.

Electrolyzers can use electricity generated from renewable energy sources to convert precursor into a fuel. For instance, an example electrolyzer can use electricity generated from renewable energy sources to convert water to a fuel such as hydrogen and/or oxygen. However, the costs of operating these electrolyzers are expensive relative to fossil fuels and are often impractical for long-term operation in a home and/or business. As a result, there is a need for a cost-effective and practical electrolyzer.

SUMMARY

An electrolyzer has an electrolytic cell with a membrane that surrounds an interior channel. The electrolytic cell also has a first electrode positioned in the interior channel such that the membrane surrounds the first electrode. The electrolytic cell also includes a second electrode positioned outside of the interior channel. In some instances, the membrane is located between the first electrode and the second electrode.

The disclosure also provides an ionic membrane sandwiched between an anode and cathode wherein the faces of the membrane are curved and wherein the membrane comprises at least one catalyst for oxygen evolution and hydrogen evolution of opposing faces. In one embodiment, the ionic membrane is non-ceramic. In another embodiment, the membrane is polymeric.

Another embodiment of an electrolyzer has multiple electrolytic cells and electronics in a housing. The electronics are in electrical communication with multiple different electrical energy sources. The electronics connect the electrical energy sources to multiple different cell selections such that each cell selection includes one or more of electrolytic cells and the one or more electrolytic cells in each of the cell selections receives electrical energy from a different one of the electrical energy sources.

Another embodiment of an electrolyzer has multiple electrolytic cells. The electrolyzer also has electronics that connect a first portion of the electrolytic cells anti-parallel to a second portion of the electrolytic cells.

The disclosure provides an electrolyzer, comprising: an electrolytic cell having a membrane that surrounds an interior channel, the electrolytic cell including a first electrode positioned in the interior channel such that the membrane surrounds the first electrode, and the electrolytic cells including a second electrode that is not positioned in the interior channel. In one embodiment, the membrane is positioned between the first electrode and the second electrode and the second electrode contacts the membrane. In another embodiment, the membrane includes a cationically conductive separator that surrounds the first electrode. In a further embodiment, the membrane includes an oxidation catalyst layer that surrounds the first electrode, the oxidation catalyst layer including one or more oxidation reaction catalysts. In yet a further embodiment, the oxidation catalyst layer surrounds the separator. In still another embodiment or further embodiment, the membrane includes a reduction catalyst layer that includes one or more reduction reaction catalysts, the separator surrounding the reduction catalyst layer and the reduction catalyst layer surrounding the first electrode. In still another embodiment, the membrane has a geometry of a hollow cylinder. In another embodiment, the membrane has a longitudinal axis that extends through a centroid of the membrane and the first electrode and the membrane are spaced apart from the longitudinal axis. In another embodiment, the electrolytic cell is one of multiple electrolytic cells positioned in a housing. In still another embodiment, the first electrode and the second electrode have concentric surfaces. In a further embodiment, the first electrode and the second electrode each includes a metal current collector and the current collector from the first electrode has a surface that is concentric with a surface of the current collector from the second electrode.

The disclosure provides an electrolyzer, comprising: multiple electrolytic cells in a housing; and electronics in the housing, the electronics being in electrical communication with multiple different electrical energy sources, the electronics connecting the electrical energy sources to multiple different cell selections such that each cell selection includes one or more of electrolytic cells and the one or more electrolytic cells included in each of the cell selections receives electrical energy from a different one of the electrical energy sources. In one embodiment, each of the electrolytic cell has a membrane that surrounds an interior channel and includes a first electrode positioned in the interior channel. In another embodiment, the electrical energy received by the one or more electrolytic cells included in at least one of the cell selections is in a form of an alternating current. In still another embodiment, a pathway that the electrical energy travels from one of the electrical energy sources to one of the cell selection excludes a rectifier. In yet another embodiment, a first one of the cell selections includes multiple electrolytic cells and the electronics connect the electrolytic cells in the first cell selection in parallel. In yet another embodiment, the electronics connect a first portion of the electrolytic cells in anti-parallel with a second portion of the electrolytic cells. In still another embodiment, the electrical energy sources are mounted on a surface of the housing. In another embodiment, the electrical energy sources include solar panels.

The disclosure also provides an electrolyzer, comprising: multiple electrolytic cells; and electronics that connect a first portion of the electrolytic cells anti-parallel to a second portion of the electrolytic cells.

DESCRIPTION

Figure 1A:
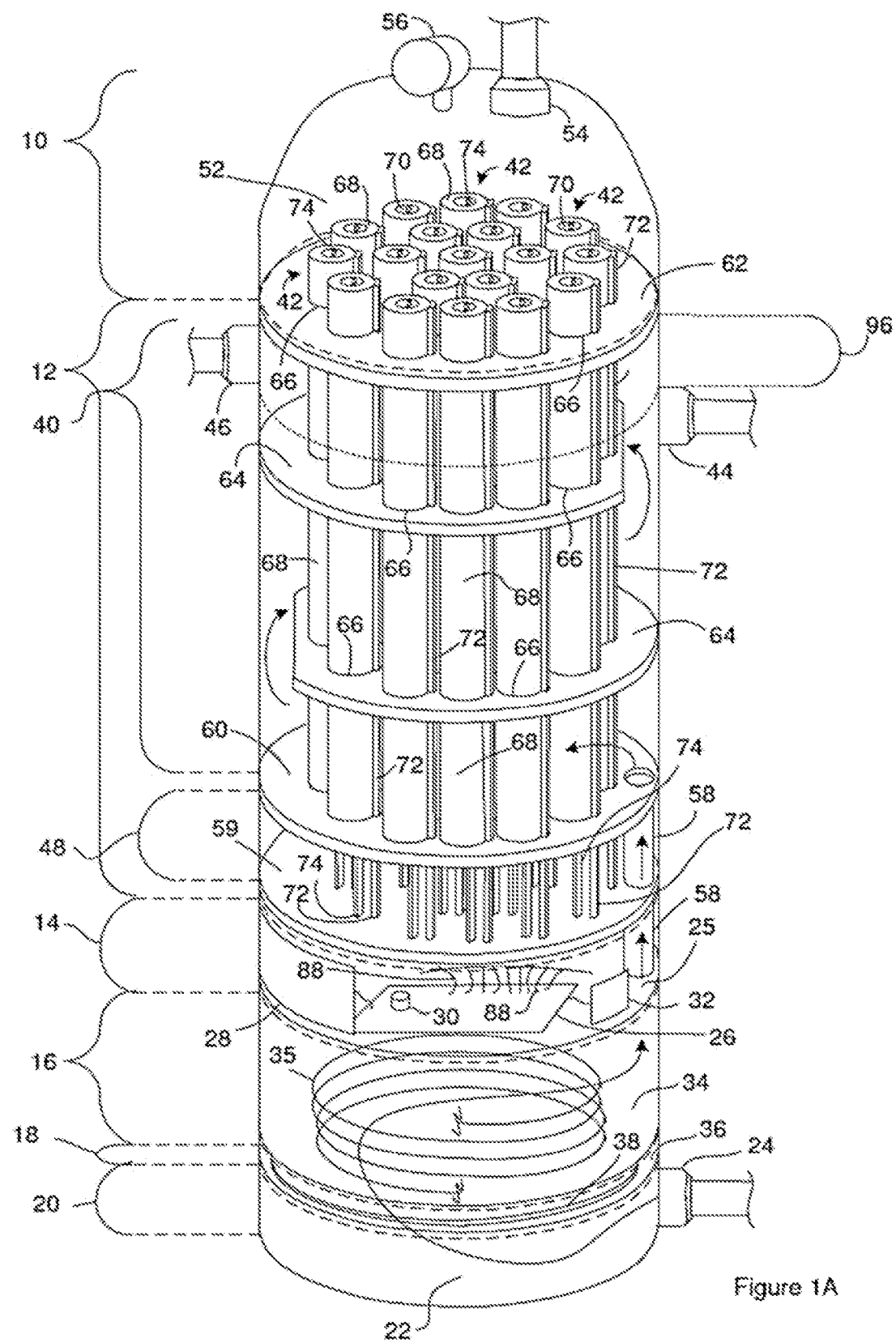
FIG. 1A is a perspective view of an electrolyzer.

As used herein and in the appended claims, the singular forms "a," "an," and "the" include plural referents unless the context clearly dictates otherwise. Thus, for example, reference to "a reactor" includes a plurality of reactors and reference to "the interface" includes reference to one or more interfaces and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. Moreover, with respect to any term that is presented in one or more publications that is similar to, or identical with, a term that has been expressly defined in this disclosure, the definition of the term as expressly provided in this disclosure will control in all respects.

Also, the use of "and" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of"

The rise in the use of alternative fuel and fuel sources provides advantages and moves away from fossil fuels. However, the use of solar or wind energy is cyclic and at time inconsistent. Accordingly, there is a need to store generated energy obtained during peak periods for use in non-peak periods of sun and wind. The energy generated from wind and solar energy can be stored in batteries, but in some instances, it would be useful to also or alternatively use the energy produced by the solar or wind energy to produce alternative storable forms of energy.

Electrolytic water-splitting processes are known. A typical electrolytic system comprises a membrane electrode assembly (MEA) comprising an anode, a cathode and an ionic membrane separating the anode and cathode. These systems can produce hydrogen gas that can be stored and used to run various hydrogen-based fuel devices (e.g., vehicles, electrical generators and the like). Generating hydrogen when a battery is full is one way to insure alternative forms of energy can be stored. In this way the operational time of a solar or wind generator system is extended beyond the charge time of the battery and can thus still perform useful energy storage in the form of hydrogen gas production. Alternatively, the bias source is not a battery, but rather a solar or photovoltaic cell or a wind-generator system etc. In this latter aspect, once a battery connected to the energy generating source is full, the energy generated bypasses the battery and is connected to a hydrogen generation system of the disclosure.

The disclosure provides a hydrogen generation system and apparatus, the system comprising: a first cell, comprising a first cell electrode and one or more first cell openings for a first cell aqueous liquid and for a first cell gas; a second cell, comprising a second cell electrode and one or more second cell openings for a second cell gas; a separator, wherein the first cell and the second cell are separated by the separator, wherein the separator is configured to block transport of one or more of $O_2$ and $H_2$ from one cell to another while having permeability for at least one or more of monovalent ions. Suitable electrodes for the first cell and second cell can be fabricated from materials such as, but not limited to, titanium or niobium, and can have an outer coating of a noble metal, such as, but not limited to, platinum. In some instances the electrodes can be made of or include semiconductive materials. The shape of the separator depends upon the design of the electrochemical cell and the conductivity of the solution stream flowing through the cell. The electrodes can be cylindrical, plate, spiral, disc, pleated or even conical shapes. The electrodes comprise first electrical connection in electrical connection with the first cell electrode, and a second electrical connection in electrical connection with the second cell electrode. The device and system can optionally comprise one or more of: an aqueous liquid control system configured to control introduction of one or more of the first cell aqueous liquid and the second cell aqueous liquid into the device/system; a storage system configured to store one or more of the first cell gas and the second cell gas external from said device/system; a pressure system configured to control one or more of (a) the pressure of the first cell gas in the first cell electrode, (b) the pressure of the first cell gas in the storage system, (c) the pressure of the second cell gas in the second cell electrode, and/or (d) the pressure of the second cell gas in the storage system; a charge control unit configured to receive electrical power from an external electrical/bias power source and configured to provide said electrical power to the device at a selected time or criteria; and a controller that can monitor the energy production and utilization of the system including electrode activity, gas pressure and gas storage An electrolyzer has a housing that contains fuel precursor in contact with one or more electrolytic cells. The housing can also contain electronics that apply electrical energy to each of the electrolytic cells. During operation of the electrolyzer, the electronics apply the electrical energy to each of the electrolytic cells so as to cause the fuel precursor to take part in a redox reaction that generates one or more fuel products that can be collected and stored.

Each of the electrolytic cells can have a membrane that is held between electrode current collectors with the membrane surrounding one of the electrode current collectors. This configuration allows the membrane to be easily removed from between the electrodes and replaced with a new membrane.

Additionally, the electronics can connect the electrolytic cells to multiple different electrical energy sources. The electrolytic cells can be connected such that different electrolytic cells receive the electrical energy from different electrical energy sources. As a result, the electronics can monitor the performance of individual electrolytic cells and/or collections of individual cells to identify electrolytic cells in need of maintenance and/or membrane replacement. The ability to identify electrolytic cells in need of maintenance and easily replace the associated membrane makes the electrolyzer practical to operate and maintain.

FIG. 1A is a perspective view of an electrolyzer. The electrolyzer includes a housing. The housing in FIG. 1A is treated as transparent so a portion of the interior components are visible from the outside of the housing. The housing has multiple housing sections. The housing sections include a cap container 10, a reactor body 12, an electronics case 14, a temperature control case 16, a purification case 18, and fuel precursor container 20. Suitable materials for the housing sections include, but are not limited to, one or more materials selected from the group consisting of metals, fiber glass, reinforced carbon polymer composites, Kevlar, and ceramics.

The fuel precursor container 20 defines all or a portion of a precursor reservoir 22 configured to hold a fuel precursor and can include a precursor input 24. The precursor reservoir 22 can receive a fuel precursor through the precursor input 24. Suitable fuel precursors include precursors for the one or more fuels to be generated by the electrolyzer. In some instance, the fuel precursor is a liquid. In one example, the fuel precursor is water. A suitable precursor input 24 includes, but is not limited to, a hose bib, a pipe nipple, coupler, and flange.

The electronics case 14 includes one or more electronics cavities 25 that holds electronics 26 configured to control the operation of the electrolyzer. The electronics 26 can include and/or be in electrical communication with one or more electrical energy sources 28. In FIG. 1A, an electrical energy source 28 is shown as positioned on an outer surface of the housing. In particular, the electrical energy source 28 is shown as positioned on an outer surface of the electronics case 14. An electrical energy source 28 can be a source of alternating current (AC) or direct current (DC). All or a portion of the electrical energy source 28 can be a source of renewable energy such as solar, wind, or hydropower. An example of electrical energy sources 28 that can be mounted on the surface of the housing includes, but is not limited to, solar cells and the prop of a wind-driven turbine. When a wind driven turbine is used as the electrical energy source 28, the propeller that drives the turbine can be located outside of the housing. A shaft attached to the propeller can extend through the housing to a turbine located within the housing. All or a portion of the electrical energy sources 28 can also be a conventional electrical energy source 28, fossil fuel source, and/or nuclear fuel source including, but not limited to, batteries and grid power.

All or a portion of the electrical energy sources 28 need not be included on the surface of the housing but can be entirely within the housing or located outside and separate from the housing. For instance, a wind-driven turbine can be located outside and separate from the housing but connected to the electronics 26 by a cable that extends through the housing. In some instances, the electrolyzer uses only power sources that are not connected to the electrical grid.

In some instances, the electronics 26 include or are in electrical communication with a rechargeable electrical power storage device 30. The electronics 26 can use electrical energy from the one or more electrical energy sources 28 to recharge the rechargeable electrical power storage device 30. The rechargeable electrical power storage device 30 can be used to power the operation of electronics 26. Suitable rechargeable electrical power storage devices 30 include, but are not limited to, batteries, capacitors, supercapacitors, flow batteries, and flywheels.

The temperature control case 16 defines all or a portion of a thermal cavity 34 that holds a temperature controller configured to control a temperature of the fuel precursor flowing through the electrolyzer. The temperature controller can be operated by the electronics 26. Suitable temperature controllers include, but are not limited to, heat exchangers, resistive heating elements, and resistors. In some instance, the temperature controller is configured to cool the fuel precursor.

The temperature controller includes one or more cooling elements and/or heating elements that contact the fuel precursor flowing through the electrolyzer. Examples of cooling elements and/or heating elements include, but are not limited to, conduits that carry a liquid for heating or cooling. An example of suitable conduits include, but are not limited to, the pipes, tubes, coils 35 and/or lumens of a heat exchanger.

The purification case 18 defines all or a portion of a purifier cavity 36 that holds one or more fuel precursor purifying components 38. The purifying component 38 can include one or more purification elements that contact the fuel precursor flowing through the electrolyzer. Suitable fuel precursor purifying components include, but are not limited to, filters, cartridges, particle beds, carbon, and membranes. An example of a suitable purification element includes or consists of one or more filter elements such as a filter elements used to generate high resistivity water.

The reactor body 12 includes and/or defines all of a portion of a reactor reservoir 40 that includes multiple electrolytic cells 42. The reactor body 12 can include a precursor output 44. Fuel precursor within the reactor reservoir 40 can flow out of the reactor reservoir 40 through the precursor output 44. A suitable precursor output 44 includes, but is not limited to, a hose bib, a pipe nipple, coupler, and flange. The reactor body 12 can also include a first fuel vent 46 through which a first fuel product within the reactor reservoir 40 can flow out of the reactor reservoir 40 for collection, storage, and/or use. In some instances, the first fuel product is in the gas state. When the fuel precursor is water, the first fuel product can be oxygen in the gaseous state. A suitable fuel vent includes, but is not limited to, a vent, a nozzle, an opening.

The reactor body 12 also includes and/or defines all of a portion of an interconnect cavity 48.

The cap container 10 includes and/or defines all of a portion of a cap reservoir 52. The cap container 10 can include a second fuel vent 54 through which a second fuel product within the cap reservoir 52 can flow out of the cap reservoir 52 for collection, storage, and/or use. In some instances, the second fuel product is in a gaseous state. When the fuel precursor is water, the second fuel product can be hydrogen in the gaseous state. A suitable second fuel vent 54 includes, but is not limited to, a vent, a nozzle, an opening.

The housing can hold one or more operational components 56 such as pressure relief valves and pressure gauges.

The electronics can include monitoring and/or diagnostic components (not shown) configured to diagnose and/or measure characteristics of all or a portion of the electrolytic cells. For instance, the electronics can include monitoring and/or diagnostic components (not shown) configured to measure the impedance, resistance, contact area, corrosion state of the electrodes of all or a portion of the electrolytic cells. The characteristics of all or a portion of the electrolytic cells can be monitored for state of health monitoring, dynamic control over individual electrolytic cell characteristics, and assessment of potential imminent electrolytic cell failure or need for replacement or replenishment of a catalyst used in an electrolytic cell.

The electronics 26 are in electrical communication with one or more user interfaces 32 that can be visible from outside of the housing. In some instances, the one or more user interfaces 32 are mounted on an external surface of the electronics case 14. The electronics 26 can operate the user interface 32 so as to provide information to an operator. Examples of information that can be provided to the operator for each electrolytic cell in all or a portion of the electrolytic cells includes, but is not limited to one, more than one, a portion or all of the characteristics selected from the group consisting of current, voltage, capacitance, impedance, resistance, temperature of, corrosion state of the electrodes. Other examples of information that can be provided to the operator include the temperature of the fuel precursor at one or more locations, and the gas pressure at one or more locations. Other examples of information that can be provided to the operator include the need to for maintenance, replacement, and/or repair of all or a portion of one or more electrolytic cells and/or components of one or more electrolytic cells as well as the identity of the one or more electrolytic cells that need the maintenance, replacement, and/or repair. Suitable user interfaces 32 include, but are not limited to, lights, screens such as LED screens and audible interfaces such as bells, buzzers, and language encoded messages.

In some embodiments, mechanic access to various components of the electrolytic cells are provided such that, for example, a single electrolytic membrane or a plurality of membranes of the system can be replaced. In other embodiments, the system allows for the replenishment of catalysts by flushing the system to remove used catalysts and/or add fresh catalysts (e.g., OER or HER catalyst and the respective sides of a membrane).

The arrows in FIG. 1A illustrate the flow of the fuel precursor through the housing. The fuel precursor enters the precursor reservoir 22 through the precursor input 24. The fuel precursor flows from the precursor reservoir 22 into the purifier cavity 36 where it is purified by the purifying component. For instance, the fuel precursor can contact and/or flow through a suitable purification element. In one example, the fuel precursor flows through the filter element of a filter.

The fuel precursor flows from the purifier cavity 36 into the thermal cavity 34 where the temperature controller adjusts the temperature of the fuel precursor to a temperature that is suitable for use in contacting the electrolytic cells 42. In some instances, all or a portion of the fuel precursor contacts and/or flows through one or more cooling elements and/or heating elements included in the temperature controller.

In some instances, the electronics 26 are in electrical communication with one or more sensor (e.g., temperature sensors, salinity sensors, pH sensors, turbidity sensors, resistance sensors, pressure sensors for both gas and/or water, and the like). The electronics 26 can use output from the one or more sensors to operate, e.g., the temperature controller in a feedback control loop etc. As a result, the electronics 26 can control various processes in fuel generation including gas output, water flow, temperature etc. of the electrolyzer at one or more locations within the electrolyzer. The one or more sensors can be located where it is desirable. For example, the location of a temperature sensor can be located at a desirable position for the temperature of the fuel precursor to be known and/or controlled. For instance, one or more of the temperature sensors can be positioned in one or more locations selected from the group consisting of the cap reservoir 52, the reactor reservoir 40, the thermal cavity 34, and the precursor reservoir 22. Suitable temperature sensors include, but are not limited to, thermocouples. Locations of other sensors will be readily apparent to one of skill in the art.

In some instances, the electronics 26 operate the temperature controller such that a temperature of the fuel precursor when it contacts one or more of the electrolytic cells 42 is greater than $-10°$ C., $0°$ C., or $10°$ C. and/or less than $80°$ C., $100°$ C., or $120°$ C. Additionally or alternately, the electronics 26 operate the temperature controller such that a temperature of the fuel precursor when it exits from the thermal cavity 34 is greater than $-10°$ C., $0°$ C., or $10°$ C. and/or less than $80°$ C., $100°$ C., or $120°$ C.

The fuel precursor flows from the thermal cavity 34 into the reactor reservoir 40. For instance, a precursor conduit 58 is configured to carry the fuel precursor from the thermal cavity 34 to into the reactor reservoir 40 without the fuel precursor entering the one or more electronics cavities 25 and/or entering the interconnect cavity 48. As a result, the fuel precursor does not come into contact with the electronics 26 in the electronics cavities 25 and/or interconnects within the interconnect cavity 48. As an example, FIG. 1A illustrates a precursor conduit 58 that extends through a bottom of the electronics case 14, through the bottom of the reactor body 12 and through a first occluding structure 60 that defines a bottom 59 of the reactor reservoir 40. Although the precursor conduit 58 is shown as being located entirely within the housing, the precursor conduit 58 can extend outside of the housing. Although the precursor conduit 58 is shown as having a one-piece construction, multiple different parts can be combined to form the precursor conduit 58. Suitable precursor conduits 58 include, but are not limited to, pipes, conduits, tubes including flexible tubing, PVC plumbing materials.

The fuel precursor flows through the reactor reservoir 40 into contact with the electrolytic cells 42 where at least a portion of the fuel precursor takes part in an electrochemical reaction so as to form one or more fuel products. The unreacted fuel precursor can flow to the precursor output 44 and can exit from the reactor reservoir 40 through the precursor output 44.

The unreacted fuel precursor that exits from the reactor reservoir 40 can be returned to the precursor input 24. As a result, the electrolyzer can include a fluid conduit that carries fuel precursor from the precursor output 44 to the precursor input 24. Unreacted fuel precursor that is returned to the precursor input 24 can be mixed with fresh fuel precursor. As an alternative to returning unreacted fuel precursor to the precursor input 24, all or a portion of the unreacted fuel precursor can be discarded. In either case, unreacted fuel precursor can be input into a heat exchanger or radiator optionally equipped with a fan to cool the fluid and reject the heat to the atmosphere.

One or more flow structures can be positioned in the reactor reservoir 40 to guide the flow of fuel precursor through the reactor reservoir 40. For instance, one or more flow structures positioned in the reactor body 12 can be configured to cause the fuel precursor to flow transverse to a longitudinal axis of the electrolytic cells 42. FIG. 1A illustrates four flow structures within the reactor body 12. One of the flow structures serves as a first occluding structure 60 that defines a bottom of the reactor reservoir 40. The perimeter edge of the first occluding structure 60 contacts the reactor body 12 such that first occluding structure 60 prevents flow of the fuel precursor within the reactor reservoir 40 around the first occluding structure 60 into the interconnect reservoir. One of the flow structures serves as a second occluding structure 62 that defines a top of the reactor reservoir 40. The perimeter edge of the second occluding structure 62 contacts the reactor body 12 such that second occluding structure 62 prevents flow of the fuel precursor within the reactor reservoir 40 around the second occluding structure 62 and into the cap reservoir 52. The flow structures can be attached to the reactor body 12 by techniques such as welding or can be integral with the reactor body 12. Alternately, a second gasket (not shown) can be positioned between the second occluding structure 62 and the reactor body 12 to seal the interface between the second occluding structure 62 and the reactor body 12. In some instances, a fastening mechanism for attaching the cap container 10 to the reactor body 12 clamps the second occluding structure 62 between the cap container and the reactor body so as to provide a pressure that pushes the second occluding structure 62 and the reactor body 12 together sufficiently for the second gasket to create a seal between the second occluding structure 62 and the reactor body 12. Additionally or alternatively, the pressure of the second fuel product in the cap reservoir can push the second occluding structure 62 toward the reactor body 12 and create a seal between the second occluding structure 62 and the reactor body 12. As another example, a first gasket (not shown) can be positioned between the first occluding structure 60 and the reactor body 12. The weight of the fuel precursor in the reactor can push the first occluding structure 60 toward the reactor body 12 sufficiently for the first gasket to create a seal between the first occluding structure 60 and the reactor body 12. The reactor body can include one or more structures on which the first gasket and/or the second gasket can be positioned. For instance, the first gasket and/or the second gasket can be positioned on an edge of the reactor body and/or the reactor body can include a flange (not shown) that extends toward an interior or an exterior of the reactor body and the first gasket and/or the second gasket can be positioned on the flange.

Two of the flow structures serve as flow directors 64. The flow directors 64 each have a perimeter edge. A portion of the edge of each flow director 64 is an occluding edge that contacts the reactor body 12 so as to prevent flow of fuel precursor between the occluding edge and the reactor body 12. A portion of the edge of each flow director 64 is a gapped edge that is spaced apart from the reactor body 12 so as to permit flow of fuel precursor between the occluding edge and the reactor body 12. The gapped edges from the different flow directors 64 are positioned such that they fuel precursor flows back and forth across the electrolytic cells 42 in a direction that is traverse to a longitudinal axis of the electrolytic cells 42. For instance the, electrolytic cells 42 can be positioned between the gapped edges of flow directors 64 that are positioned along the length of the reactor reservoir 40.

The second occluding structure 62 and the flow directors 64 each includes multiple openings 66. Each of the openings 66 in the second occluding structure 62 is aligned with an opening in each of the flow directors 64 such that each of the electrolytic cells 42 extends through an opening 66 in the second occluding structure 62 and an flow director 64 in each of the flow directors 64. The interface between each of the electrolytic cells 42 and the second occluding structure 62 is configured such that a seal is formed between the electrolytic cells 42 and the second occluding structure 62. As a result, fuel precursor and/or the first fuel product cannot flow between any of the electrolytic cells 42 and the second occluding structure 62 into the cap reservoir 52. A suitable mechanism for forming a seal between an electrolytic cell 42 and the second occluding structure 62 includes, but is not limited to, adhesives such as glue, sealants, pressure, compression, and gaskets.

The flow director 64 in each of the flow directors 64 can serve to hold the electrolytic cells 42 in place within the electrolyzer and can stabilize the electrolytic cells 42 against the flow of the fuel precursor. As a result, the illustrated flow directors 64 can serve as supports and can be configured such that the do not provide any flow directing functionality. For instance, the flow directors 64 can be porous while still having flow directors 64 that hold and stabilize the electrolytic cells 42.

Figure 1B:
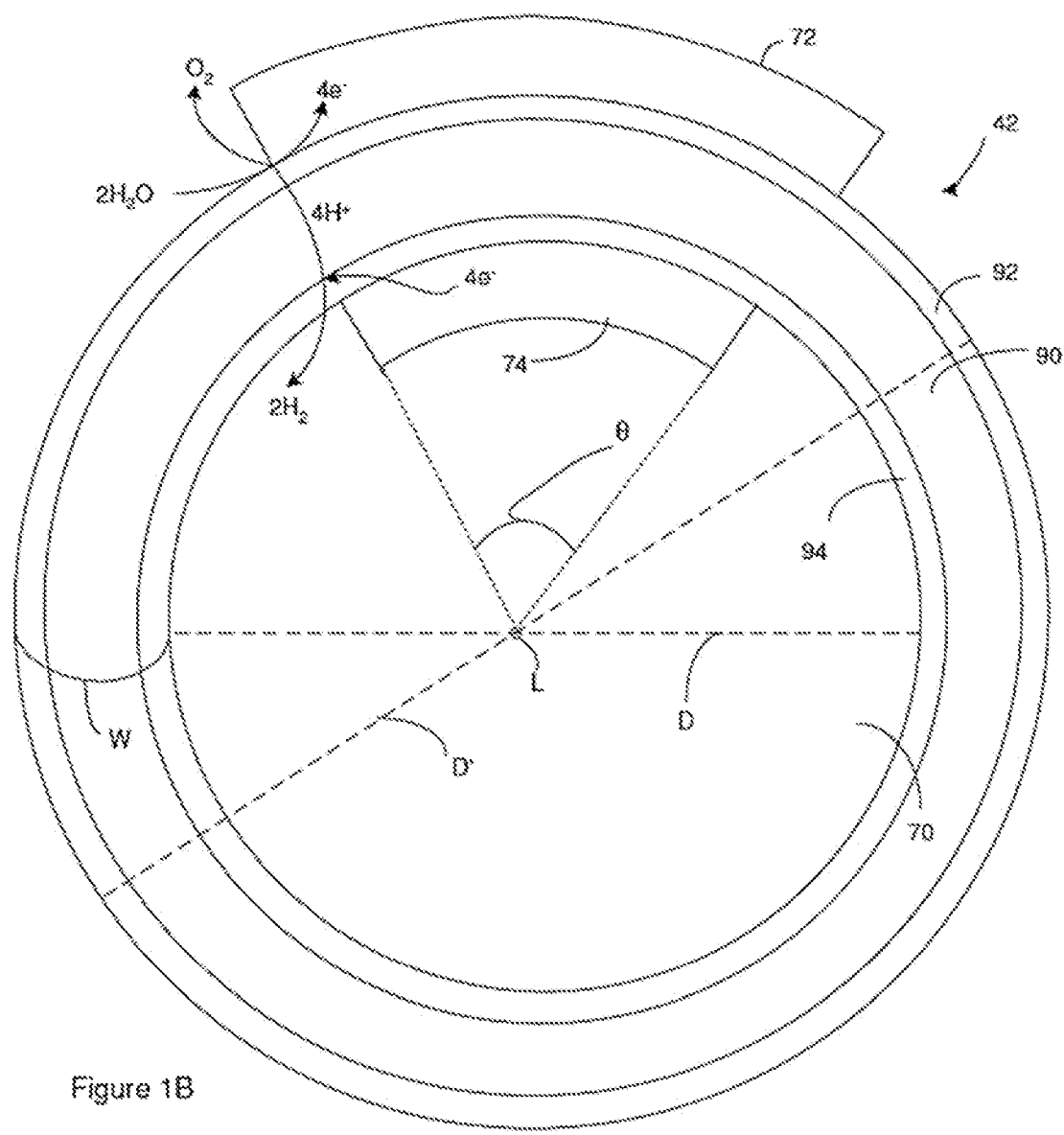
FIG. 1B is a cross section of an electrolytic cell suitable for use in the electrolyzer of FIG. 1A.

FIG. 1A provides a perspective view of the electrolytic cells 42 as they are positioned within the electrolyzer. FIG. 1B is a cross section of one of the electrolytic cells 42 shown in FIG. 1A. The electrolytic cells 42 each includes multiple electrode current collectors in contact with a membrane 68. The membrane 68 includes and/or defines an interior channel 70. At least one of the electrode current collectors is positioned in the interior channel 70. For instance, the membrane 68 can surround at least a portion of at least one of the electrode current collectors. At least one of the electrode current collectors is positioned on an exterior of the membrane 68 and is not surrounded by the membrane 68.

In the electrolytic cells 42 of FIG. 1A, an anode current collector 72 and a cathode current collector 74 contact the membrane 68. The cathode current collector 74 is positioned in the interior of an interior channel 70 defined by the membrane 68 such that the membrane 68 surrounds at least a portion of the cathode current collector 74. The anode current contacts an exterior of the membrane 68 and is not surrounded by the membrane 68.

The anode current collector 72 and the cathode current collector 74 of each electrolytic cell 42 extends along a length of the electrolytic cell 42 and parallel or substantially parallel to a longitudinal axis of the membrane 68 (labeled L in FIG. 1B and located at the centroid of the membrane 68). The anode current collector 72 and the cathode current collector 74 each extends beyond the membrane 68 and through the first occluding structure 60. An interface between the first occluding structure 60 and each of the anode current collectors 72 is configured such that a seal is formed between the first occluding structure 60 and the anode current collector 72. The seal between the first occluding structure 60 and the anode current collector 72 can prevent the fuel precursor from flowing from the reactor reservoir 40, between the first occluding structure 60 and the anode current collector 72 into the interconnect reservoir. A suitable mechanism for forming a seal between the first occluding structure 60 and each of the anode current collectors 72 includes, but is not limited to, adhesives such as glue, sealants, pressure, compression, and gaskets.

An interface between the first occluding structure 60 and each of the cathode current collectors 74 is configured such that a seal is formed between the first occluding structure 60 and the cathode current collector 74. The seal between the first occluding structure 60 and the cathode current collector 74 can prevent the fuel precursor from flowing from the reactor reservoir 40, between the first occluding structure 60 and the cathode current collector 74 into the interconnect reservoir. A suitable mechanism for forming a seal between the first occluding structure 60 and each of the cathode current collectors 74 includes, but is not limited to, adhesives such as glue, sealants, pressure, compression, and gaskets.

Figure 1C:
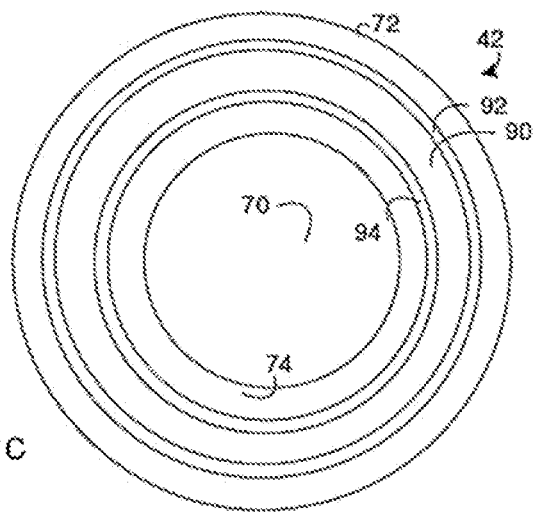
FIG. 1C is a cross section of an electrolytic cell suitable for use in the electrolyzer of FIG. 1A.
Figure 1D:
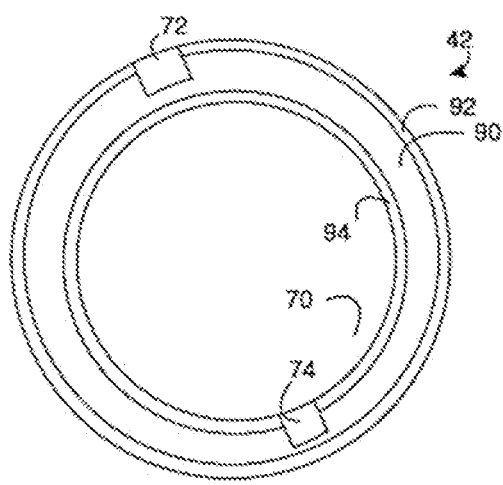
FIG. 1D is a cross section of an electrolytic cell suitable for use in the electrolyzer of FIG. 1A.

The membranes 68 on the different electrolytic cells 42 do not extend through the first occluding structure 60 and can rest on the first occluding structure 60. The interface between each of the membranes 68 and the first occluding structure 60 is configured such that a seal is formed between each of the membranes 68 and the first occluding structure 60. The seal between each of the membranes 68 and the first occluding structure 60 can prevent flow of the fuel precursor from the reactor reservoir 40 into an interior channel 70 of any of the electrolytic cells 42. A suitable mechanism for forming a seal between the first occluding structure 60 and each of the membranes 68 includes, but is not limited to, glue, sealants, pressure, compression, and gaskets. Additionally or alternately, the first occluding structure 60 can include a structure for sealing the seal between the first occluding structure 60 and each of the membranes 68. As an example, FIG. 1F is a cross section of an interface between a first occluding structure 60 and an electrolytic cell. The first occluding structure 60 has a projection 71 that extends from the body of the first occluding structure 60 into the reactor reservoir. The projection is received in the interior channel of the membrane. A seal between the projection and the membrane can be provided by one or more mechanisms selected from the group consisting of a press fit, an adhesive, glue, and a sealant.

The anode current collector extends through the projection 71 and the body of the first occluding structure 60. The cathode current collector extends through the body of the first occluding structure 60. As is evident from FIG. 1A, the anode current collectors 72 and the cathode current collectors 74 each extends through the interconnect reservoir and through a top of the electronics case 14 such that the anode current collectors 72 and the cathode current collectors 74 can be each accessed from an interior of the one or more electronics cavities 25 within the electronics case 14. The electronics are in electrical communication with interconnects 88. Each interconnect 88 provides electrical communication between the electronics 26 and one of the anode current collectors 72 or between the electronics 26 and one of the cathode current collectors 74. As a result, the electronics 26 can apply a bias between the anode current collector 72 and the cathode current collector 74 of each electrolytic cell 42. The electronics 26 can connect the electrolytic cell 42 in parallel, in series, or can operate them independently so that different bias levels can be applied to different electrolytic cells 42.

Figure 1E:
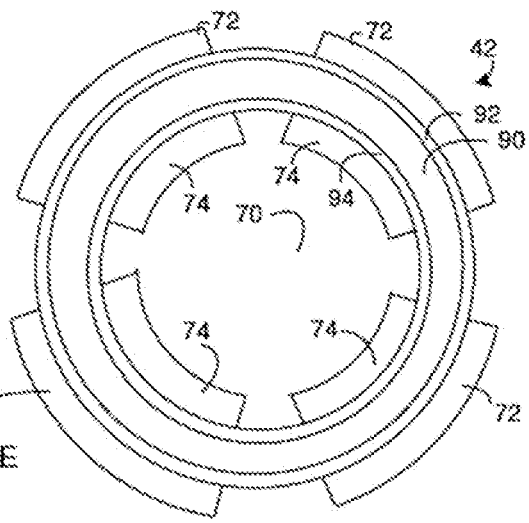
FIG. 1E is a cross section of an electrolytic cell suitable for use in the electrolyzer of FIG. 1A.
Figure 1F:
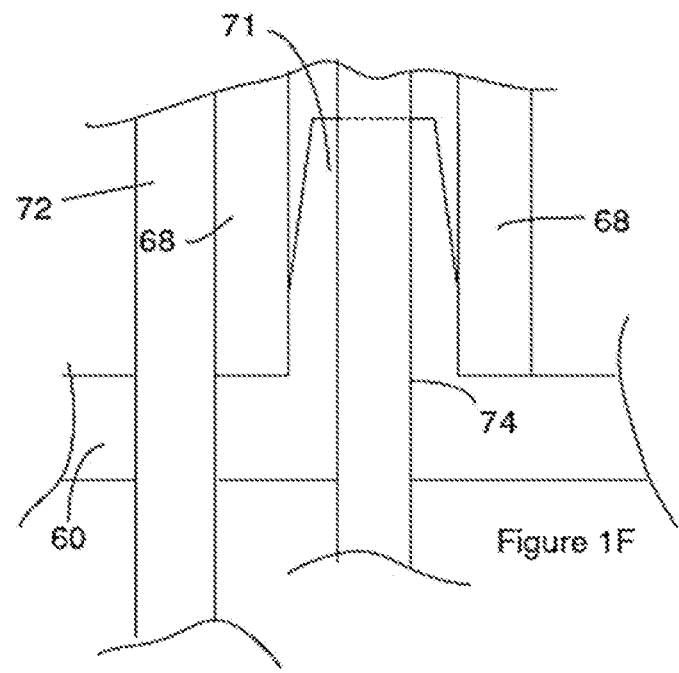
FIG. 1F is a cross section of an interface between an electrolytic cell and an occluding structure in the electrolyzer.
Figure 1G:
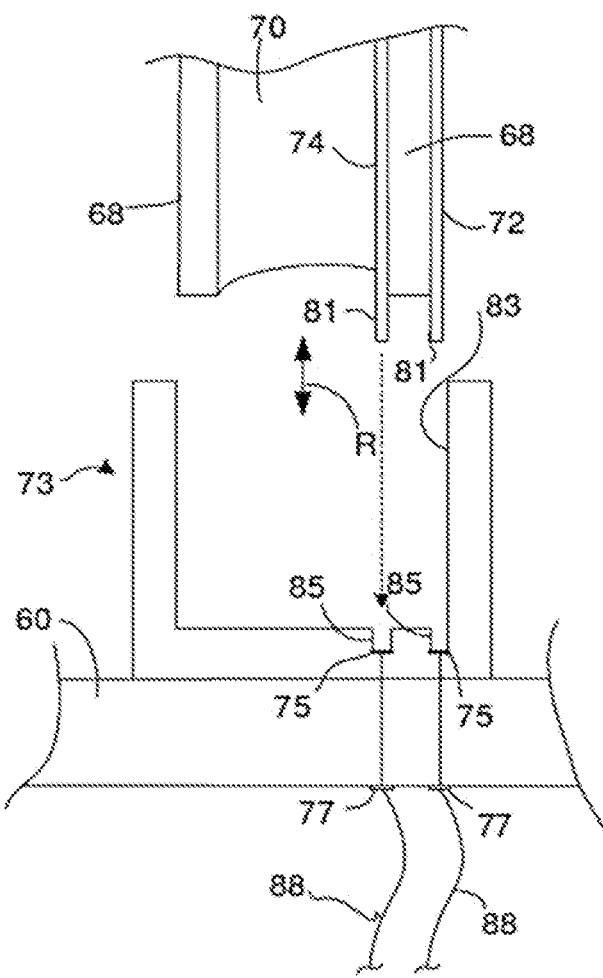
FIG. 1G is a cross section of an interface between an electrolytic cell and an occluding structure in the electrolyzer.

FIG. 1G illustrates another configuration of the interface between each of the membranes 68 and the first occluding structure 60. A receptacle 73 is mounted on the first occluding structure and is configured to receive an end of an electrolytic cell. The receptacle includes electrical contacts 75 that are each in electrical communication with a second electrical contact 77 on a bottom of the first occluding structure. The second electrical contacts 77 are each in electrical communication with one of the interconnects 88. As a result, the interconnects 88 and the second electrical contacts 77 provide electrical communication between the electronics and the electrical contacts 75 in the receptacle 73. The electrolytic cell includes terminals 81 that are accessible at the end of the electrolytic cell. Each terminal 81 is in electrical communication with one of the electrode current collectors (the anode current collector or the cathode current collector). In some instances, the portion of the anode current collector and the portion of the cathode current collector that extends beyond the membrane can serve as a terminal or the anode current collector and the cathode current collector can each be connected to a structure that serves as the terminal. The receptacle 73 includes an opening 83 configured to receive the terminal end of the electrolytic cell as illustrated by the arrow labeled R in FIG. 1G. The receptacle 73 includes ports 85 that each receives one of the terminals 81 when the electrolytic cell is received in the opening of the receptacle 73. The ports 85 are configured such that the terminal 81 is in contact with one of the electrical contacts 75 when the electrolytic cell is received in the opening of the receptacle 73 and is engaged. As a result, the interconnects 88, the second electrical contacts 77, the electrical contacts 75 and the terminals 81 provide electrical communication between the electronics and one of the electrode current collectors.

Engaging the electrolytic cell with the receptacle can stabilize the electrolytic cell in the receptacle and connect the terminals to the electrical contacts 75. As a result, the ports 85 can have an engagement configuration such as are present in the sockets for light bulbs such as fluorescent light bulb sockets, halogen light bulb sockets, or an incandescent light bulb sockets. As a result, in some instances, the electrolytic cell is engaged and disengaged from the receptacle in a manner similar to a light bulb. For instance, the electrolytic cell can be engaged and disengaged from in the receptacle by twisting the electrolytic cell in the opening of the receptacle. Alternately, the electrolytic cell can be engaged by pushing the electrolytic cell into the opening of the receptable and disengaged by pulling the electrolytic cell out of the opening.

The membrane 68 includes a separator 90 between an oxidation catalyst layer 92 and a reduction catalyst layer 94. In the electrolytic cell 42 of FIG. 1A through FIG. 1C, the oxidation catalyst layer 92 surrounds the separator 90, the reduction catalyst layer 94, and the interior channel 70. The separator 90 surrounds the reduction catalyst layer 94 and the interior channel 70. The reduction catalyst layer 94 surrounds the interior channel 70 and the reduction catalyst defines the interior channel 70.

The separator 90 is ionically conductive. In some instances, the separator 90 is cationically conductive while concurrently being sufficiently nonconductive to the other components of the fuel precursor that the fuel precursor and the second fuel product in the interior channel 70 of the electrolytic cell 42 remain separated. In other instances, the separator 90 is cationically conductive and non-conductive or substantially non-conductive to nonionic atoms and/or nonionic compounds. In some instances, the separator 90 is conductive to monovalent cations while being non-conductive or substantially non-conductive to nonionic atoms and/or nonionic compounds, multivalent cations and also to anions. Accordingly, the separator 90 can provide a pathway along which cations can travel from the oxidation catalyst layer 92 to the reduction catalyst layer 94 without providing a pathway or a substantial pathway from the oxidation catalyst layer 92 to the reduction catalyst layer 94 to one, two, or three entities selected from a group consisting of anions, nonionic atoms or nonionic compounds. Alternatively, the separator 90 can provide a pathway along which anions can travel from the reduction catalyst layer 94 to the oxidation catalyst layer 92 to the without providing a pathway or a substantial pathway from the oxidation catalyst layer 92 to the reduction catalyst layer 94 to one, two, or three entities selected from a group consisting of cations, nonionic atoms or nonionic compounds.

A suitable separator 90 can be a single layer or material or multiple layers of materials. In some instances, all or a portion of the one or more layers of material are each a non-ceramic layer and/or a layer that includes or consists of a polymer. Example materials for the one or more layers of the separator 90 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. A suitable material for use as one or more layers of the separator 90 is sold under the trademark NAFION®. NAFION® is an example of a material that is cationically conductive of cations but is not conductive of anions or nonionic atoms or nonionic compounds. Another suitable separator 90 includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups. Other examples of suitable material for use as one or more layers of the separator 90 are cationic analogues to Nafion that have fixed positive charges like quaternary ammonium groups on a perfluorinated backbone and that predominantly or exclusively conduct monovalent negatively charged hydroxide ions.

In some instances, the separator 90 is a single layer or material or multiple layers of materials where all or a portion of the one or more layers of material are each a non-ceramic layer and/or a layer that includes or consists of a polymer and is conductive to monovalent cations while being non-conductive or substantially non-conductive to nonionic atoms and/or nonionic compounds, multivalent cations and anions. In some instances, the separator 90 is a single layer or material or multiple layers of materials where all or a portion of the one or more layers of material are each a non-ceramic layer and/or a layer that includes or consists of a polymer and is conductive to monovalent cations and anions while being non-conductive or substantially non-conductive to nonionic atoms and/or nonionic compounds and multivalent cations.

The oxidation catalyst layer 92 includes, consists of, or consists essentially of one or more of oxidation catalysts. The oxidation catalyst layer 92 can include components in addition to the one or more oxidation catalysts. For instance, the oxidation catalyst layer 92 can include one or more components selected from the group consisting of binders, polymers, membranes, electrical conductors, ionic conductors, solid electrolytes, porous materials, and inert support materials. Suitable oxidation catalysts for use in the oxidation catalyst layer 92 include, but are not limited to, $Mn_uSb_vO_w$, $IrO_2$, $RuO_2$, FeNi oxyhydroxide, Fe lanthanates, and inorganic perovskites.

The reduction catalyst layer 94 includes, consists of, or consists essentially of one or more of reduction catalysts. The reduction catalyst layer 94 can include components in addition to the one or more reduction catalysts. For instance, the reduction catalyst layer 94 can include one or more components selected from the group consisting of binders, metals, semimetals, 2-dimensional materials, porous 3-dimensional materials, nanoparticles, nanosheets, foams, and fibers. Suitable reduction catalysts include, but are not limited to, Pt, NiMo, NiCo, $CoP_2$, $FeP_2$, $MoS_2$, MoPS and molecular electrocatalysts such as Co(II) complexes with macrocyclic ligands, Fe(II) complexes with macrocyclic ligands, and Fe—S complexes that resemble metalloenzymes such as nitrogenase or hydrogenase.

Suitable materials for the anode current collector include, but are not limited to, metals such as Stainless Steel, titanium, and other non-corroding electrode materials. Suitable materials for the cathode current collector include, but are not limited to, metals such as copper, aluminum, steel, titanium, nickel, and other non-corroding materials.

The membrane 68 can include other layers in addition to the oxidation catalyst layer 92 and a reduction catalyst layer 94. Examples of other layers include, but are not limited to, Gas Diffusion Layers. A gas diffusion layer can optionally be located over the oxidation catalyst layer 92 such that the gas diffusion layer is between the anode current collection and the oxidation catalyst layer 92 and/or such that the gas diffusion layer surrounds the oxidation catalyst layer 92. Additionally or alternately, a gas diffusion layer can optionally be located between the cathode current collector and the reduction catalyst layer 94 and/or can surround the cathode current collector. A gas diffusion layer can allow the gas bubbles to percolate through the gas diffusion layer without block contact between the electrodes and the fuel precursor and the catalytic layer. An example of a suitable gas diffusion layer includes, but is not limited to, titanium nanoparticles, titanium or steel mesh, conducting polymers, semiconducting nanoparticles or meshes, or other porous materials that also allow for electrical conduction. In some instances, a gas diffusion layer is integrated into the oxidation catalyst layer 92 and/or reduction catalyst layer 94 such that the oxidation catalyst layer 92 and/or reduction catalyst layer 94 can act as a gas diffusion layer.

In some instance, the components of the membrane 68 are arranged such that an exterior surface of the oxidation catalyst layer 92 serves as and/or define the exterior of the membrane 68. As a result, fuel precursor and/or anode current collector 72 in contact with the electrolytic cell 42 can be in direct contact with the oxidation catalyst layer 92. In some instances, an interior surface of the reduction catalyst layer 94 can serve as or define the interior of the membrane 68. As a result, a second fuel product in the interior channel 70 can be in direct physical contact with the interior surface of the reduction catalyst layer 94.

The electronics 26 can apply a voltage between the anode current collector 72 and the cathode current collector 74 of all or a portion of the electrolytic cells 42 that is sufficient to cause the fuel precursor to take part in an electrochemical redox reaction at a surface of the electrolytic cell 42. FIG. 1B illustrates an example redox reaction that can be driven by the electronics 26 when the fuel precursor is water. The electronics 26 apply a bias between the anode current collector 72 and the cathode current collector 74 that is sufficient to cause of oxidation of water at the oxidation catalyst by the Oxygen Evolution Reaction (OER) illustrated in FIG. 1B. The oxidation of the water produces protons, electrons, and oxygen in the gaseous state. The oxygen can rise through the fuel precursor in the reaction chamber to a pocket 96 of the first fuel product located over the fuel precursor. Oxygen in the pocket is in contact with the first fuel vent 46. As a result, the oxygen can exit the reactor reservoir 40 and the housing through the first fuel vent 46 and can serve as the first fuel product. In some instances, the first fuel product is not collected and/or stored. In these instances, the portion of the reactor body 12 that houses the pocket 96 of the first fuel product can have openings (not shown) that extend through the reactor body 12 so as to provide the first fuel product with a pathway from the pocket 96 to the atmosphere in which the electrolyzer is positioned. As a result, the first fuel product can be vented to the atmosphere in which the electrolyzer is positioned and the first fuel vent 46 housing can exclude the first fuel vent 46. In some instances, the openings are holes, channels, or conduits through the reactor body 12. Alternately, the reactor body 12 can include a porous membrane having pores through which the first fuel product in the pocket can travel to reach the atmosphere in which the electrolyzer is positioned.

The reactions illustrated in FIG. 1B use a separator that conducts monovalent cations. However, in some instances, the separator is anionically conductive. As a result, hydroxide ions can flow through the separator in the opposite direction of electron flow through the separator.

The electrons generated by the oxygen evolution reaction (OER) can travel through the anode current collector 72 and toward the electrical energy source 28.

Since the separator 90 is cationically conductive, the protons generated by the oxygen evolution reaction (OER) can pass through the membrane 68 and can be received at the reduction catalyst layer 94. Additionally, electrons can travel from the electrical energy source 28 to the cathode current collector 74. The electrons can react with the protons at the reduction catalyst layer 94 to form hydrogen by the Hydrogen Evolution Reaction (HER) illustrated in FIG. 1B. The hydrogen can enter the interior channel 70 in a gaseous state. The hydrogen in the interior channel 70 can flow into the cap reservoir 52 and into contact with the second fuel vent 54. As a result, the hydrogen can exit the cap reservoir 52 and the housing through the second fuel vent 54 and can serve as the second fuel product.

In some instances, the interior channels of different electrolytic cells can each be connected to a different conduit (not shown) such that the second fuel product flows from the interior channel into the conduit. The different conduits can each be connected to a common conduit such that the second fuel product flows from different conduit into the common conduit. The common conduit can carry the second fuel product to a storage container or collection vessel. The use of conduits to collect the second fuel product can replace the cap container. As a result, the cap container can optionally be excluded from the electrolyzer. The conduits and the common conduit can each be constructed of one or more different components. For instance, a conduit can be constructed of a tube and a connector that provides fluid communication between the tube and the interior channel of an electrolytic cell. Suitable components for the conduits and the common conduit include, but are not limited to, pipes, tubes, flexible tubing, PVC tubing, hoses, and carbon composite or polymer hoses.

The cross section shown in FIG. 1B is taken perpendicular to the longitudinal axis of the electrolytic cell 42. As is evident from FIG. 1B, the electrolytic cell 42 can have a round cross section. As a result, the membrane can have a cylindrical shape. Other configurations of the membrane and/or electrolytic cell are possible. For instance, the electrolytic cell 42 and/or membrane can have a cross section that is oval, square, and rectangular.

As is evident from FIG. 1A, the anode current collector can have one or more surfaces that are concentric with one or more surfaces of the cathode current collector.

The location of the longitudinal axis of the membrane is labeled L in FIG. 1B (also in FIG. 3B below). The longitudinal axis passes through the centroid of the membrane. The membrane is spaced apart from the longitudinal axis. The cathode current collector can optionally be spaced apart from the longitudinal axis to increase the portion of the interior channel that is available for flow of the second fuel product.

The diameter and/or width of the interior channel is labeled D in FIG. 1B. In some instances, the diameter and/or width of the interior channel is greater than 1 micron, 10 microns, 100 microns, 1 mm, 1 cm, or 10 cm and/or less than 1 meter, 100 cm, 10 cm or 1 cm. The diameter and/or width of the membrane is labeled D' in FIG. 1B. In some instances, the diameter and/or width of the membrane is greater than 10 nm, 100 nm, 1 micron, 10 microns, or 100 microns and/or less than 20 nm, 200 nm, 1 microns, 20 microns, 100 microns, or 1 mm.

FIG. 1B shows the anode current collector 72 and the cathode current collector 74 each contacting the membrane 68 over a contact angle of the membrane 68 labeled θ. Suitable contact angles (θ) include, but are not limited to, contact angles greater than 10, 20, or 45 degrees and/or less than 350, 180, or 90 degrees where the contact angle is measured from the longitudinal axis of the membrane. In some instances, the membrane has a cross section where the cathode current collector contacts more than 0.1%, 1%, or 10% and/or less than 50%, 70% or 90% of the interior of the membrane and/or the membrane has a cross section where the anode current collector contacts more than 0.1%, 1%, or 10% and/or less than 50%, 70% or 90% of the exterior of the membrane. In some instances, the anode current collector 72 surrounds the membrane and/or the cathode current collector 74 surround a portion of the interior channel as shown in FIG. 1C. As a result, the anode current collector 72 and/or the cathode current collector 74 can surround the longitudinal axis of the membrane. The current collectors can also be a mesh of wires like a window screen as opposed to a continuous thin or thick film of material.

The anode current collector can be embedded in the membrane such that the anode current collector has an exterior surface that is flush or substantially flush with an exterior surface of the membrane. Additionally or alternately, the cathode current collector can be embedded in the membrane such that the cathode current collector has an interior surface that is flush or substantially flush with an interior surface of the membrane. As an example, FIG. 1D is a cross section of an electrolytic cell where an exterior surface of the anode current collector is flush or substantially flush with an exterior surface of the membrane and an interior surface of the cathode current collector is flush or substantially flush with an interior surface of the membrane.

An electrolytic cell can include one or more cathode current collectors that are surrounded by the membrane and/or there can be multiple anode collectors external to the membrane. For instance, FIG. 1D is a cross section of an electrolytic cell multiple different cathode current collectors in the interior channel of the membrane and there are multiple anode current collectors external to the membrane. In some instances, the cathode current collectors and the anode current collectors run along the length of the electrolytic cell as disclosed above. The cathode current collectors can be connected to a common electrical conductor (not shown) that is in electrical communication with a interconnect 88 so as to provide electrical communication between the electronics and the cathode current collectors. The anode current collectors can be connected to a common electrical conductor (not shown) that is in electrical communication with a interconnect 88 so as to provide electrical communication between the electronics and the anode current collectors.

The housing sections can include doors, openings, and other ports that allow an operator to access their contents. Additionally or alternately, the housing sections can be moved relative to one another in order to access their contents for maintenance, tuning, reconfiguration, and repair or parts replacement. For instance, the cap container 10 can be separated from the reactor body 12 so as to permit an operator access to the electrolytic cells 42. As another example, the electronics case 14 can be separated from the reactor body 12 and the temperature control case 16 to permit an operator access to the electronics 26. As another example, the purification case 18 can be separated from the fuel precursor container 20 and the temperature control case 16 as to permit an operator access to the fuel precursor purifying components. As another example, the temperature control case 16 can be separated from the purification case 18 and the electronics case 14 so as to permit an operator access to the temperature controller. The separation of housing sections can be partial or full separation. For instance, separated housing sections can remain hinged together so they can be rotated in and out of position. The electrolyzer can include fastening mechanisms to hold adjacent housing sections in place relative to one another. Suitable fastening mechanisms include, but are not limited to, locks, latches, bolted flanges, fasteners such as screws and bolts, threads, pressure seals, gaskets, and springs.

Figure 2:
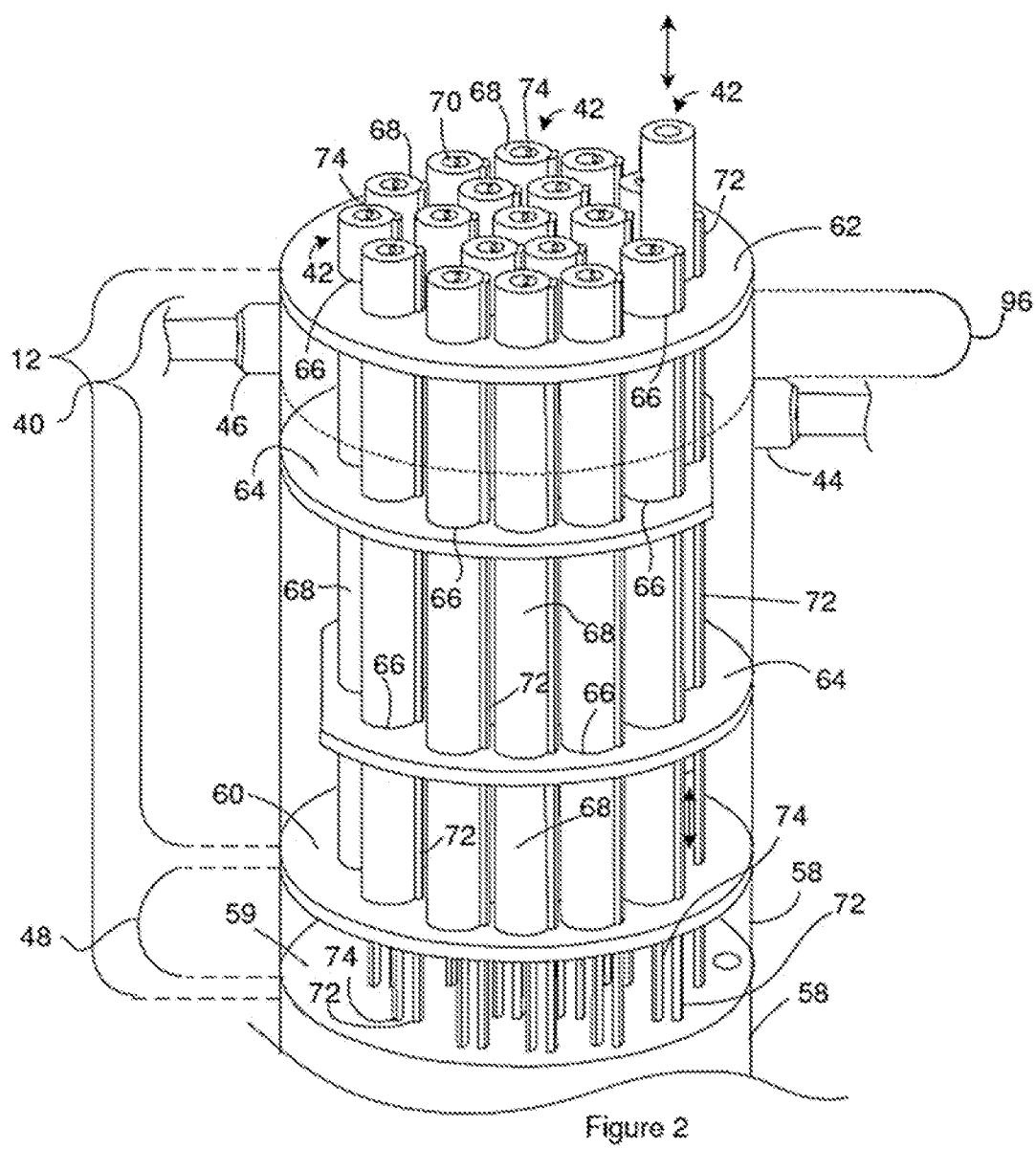
FIG. 2 is an expanded view of an electrolytic cell of FIG. 1A.

Over time, the performance of the membrane 68 degrades. As a result, it is often desirable for replace the membrane 68 in all or a portion of the electrolytic cells 42. For instance, the oxidation catalyst and/or the reduction catalyst can be flushed out. When oxidation catalyst and/or the reduction catalyst becomes flushed out, new oxidation catalyst and/or the reduction catalyst can be introduced into the flow of fuel precursor to be absorbed onto or reacted with the membrane. Alternately, the membrane in one or more of the electrolytic cells can be replaced with a new, refreshed, or repaired membrane. The electrolyzer construction of FIG. 1A and FIG. 1B provides easy changing of the membrane 68. For instance, a membrane 68 in an electrolytic cell 42 need not be immobilized relative to the anode current collector 72 and the cathode current collector 74 of the electrolytic cell 42 but can be held in place by friction between the anode current collector 72 and the cathode current collector 74. In some instances, the anode current collector 72 and the cathode current collector 74 apply enough pressure to the membrane to effectively clamp the membrane between the anode current collector 72 and the cathode current collector 74. As a result, the membrane 68 of an electrolytic cell 42 can be slid relative to the anode current collector 72 and the cathode current collector 74 of the electrolytic cell 42. As an example, FIG. 2 illustrates a portion of the electrolyzer shown in FIG. 1A. The arrows labeled M illustrate movement of a membrane 68 relative in one of the electrolytic cells 42 relative to the anode current collector 72 and the cathode current of the same electrolytic cell 42.

The ability to move the membrane 68 in one of the electrolytic cells 42 relative to the anode current collector 72 and the cathode current of the same electrolytic cell 42 allows the membrane 68 to be replaced. For instance, an operator can separate the cap container 10 from the reactor body 12 as shown in FIG. 2. The operator can drain the fuel precursor from the reactor reservoir 40 through the precursor input 24. The operator can grasp a membrane 68 by hands or with a tool and pull the membrane 68 from between the associated anode current collector 72 and cathode current collector 74. The operator can replace the membrane 68 with a new membrane 68, refreshed membrane 68, or a repaired membrane 68. The operator can replace the cap container 10 and refill the reactor reservoir 40 with fuel precursor.

When the electrolytic cell is constructed such that an exterior surface of the anode current collector is flush or substantially flush with an exterior surface of the membrane and an interior surface of the cathode current collector is flush or substantially flush with an interior surface of the membrane as disclosed in the context of FIG. 1D, the electrolytic cell can be twisted or rotated within any openings 66 in a second occluding structure 62 and/or any flow directors 64. When the anode current collector 72 surrounds the membrane and/or the cathode current collector 74 surrounds a portion of the interior channel as disclosed in the context of FIG. 1C, the electrolytic cell can be twisted or rotated within any openings 66 in a second occluding structure 62 and/or any flow directors 64. The ability to rotate the electrolytic cell allows the terminal end of the electrolytic cell to be rotated within a receptacle such as the receptacle disclosed in the contact of FIG. 1G. Accordingly, an operator can remove an electrolytic cell by separating the cap container 10 from the reactor body 12 as shown in FIG. 2. The operator can drain the fuel precursor from the reactor reservoir 40 through the precursor input 24. The operator can grasp an electrolytic cell by hands or with a tool and disengage the electrolytic cell from the receptacle by pulling and/or twisting the electrolytic cell. The disengaged electrolytic cell can then be pulled out of the electrolyzer. The operator can replace the electrolytic cell with a new electrolytic cell, refreshed electrolytic cell, or a repaired electrolytic cell. The operator can replace the cap container 10 and refill the reactor reservoir 40 with fuel precursor.

In some instances, it is desirable to remove the second occluding structure 62 when replacing an electrolytic cell. For instance, when the anode current collector and the cathode current collector do not extend above the second occluding structure 62 and the anode current collector is proud of the exterior surface of the membrane, the anode current collector may not pull through an opening 66 in the second occluding structure 62 and can stop the electrolytic cell from being removed. As a result, it may be necessary to remove the second occluding structure 62 to replace the electrolytic cell. Additionally or alternately, removing the second occluding structure 62 can simplify the processing of engaging and/or disengaging an electrolytic cell with a receptacle. The use of the second gasket to seal the interface between the second occluding structure 62 and the reactor body 12 as disclosed above can permit the second occluding structure 62 to be removed. For instance, when the second occluding structure 62 is clamped between the cap container and the reactor body, unclamping the second occluding structure 62 permits the second occluding structure 62 to be removed.

When the electrolyzer is constructed to have electrolytic cells replaced, the one or more anode current collectors and the one or more cathode current collectors can be immobilized relative to the membrane to provide the electrolytic cell with a monolithic cartridge configuration. For instance, the one or more anode current collectors and the one or more cathode current collectors can be immobilized relative to the membrane using a mechanism such as pressure, soldering, welding, glue, springs, pins, and sockets.

Figure 3A:
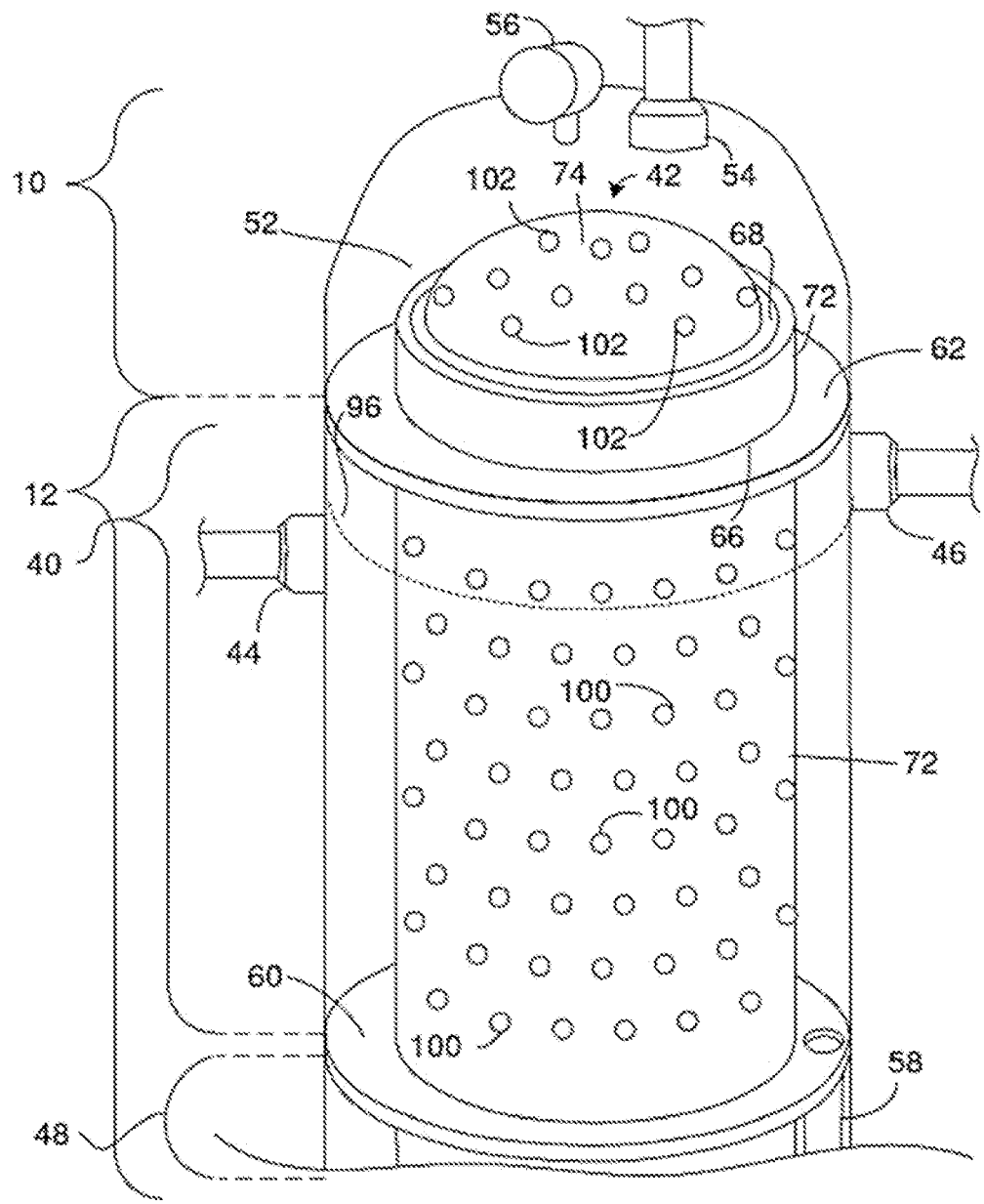
FIG. 3A is a perspective view of an electrolyzer.

The flow directors 64 are optional. Additionally or alternately, the electrolyzer can include a single electrolytic cell 42. Additionally or alternately, the anode current collector 72 in an electrolytic cell 42 can surround the membrane 68 in the electrolytic cell 42. As an example, FIG. 3A is a perspective view of the electrolyzer of FIG. 1A modified to have a single electrolytic cell 42 with an anode current collector 72 that surrounds the membrane 68. FIG. 3B is a cross section of the electrolytic cell 42 shown in FIG. 3A taken perpendicular to the longitudinal axis of the electrolytic cell 42.

The electrolyzer does not have flow directors 64. As a result, the fuel precursor flows from the precursor conduit 58, into contact with the anode current collector 72 in the reactor reservoir 40, and to the precursor output 44.

The anode precursor includes multiple channels 100 that allow the fuel precursor in the reactor reservoir 40 to flow through the anode current collector 72 into contact with the underlying membrane 68. The channels 100 also allow unreacted fuel precursor to flow from the membrane 68 through anode current collector 72 and to the precursor output 44. The channels 100 can also permit the first fuel product to flow from the membrane 68 and through the anode current collector 72 where the first fuel product can rise through the fuel precursor to the pocket of first fuel product above the fuel precursor. First fuel product in the pocket is in contact with the first fuel vent 46 and can exit the reactor reservoir 40 and the housing through the first fuel vent 46. Although the channels 100 are illustrated as openings through the anode current collector 72, the channels 100 can have a variety of forms and can have one or more features selected from the group consisting of straight, branched, tortuous, curved, twisted, and bent. For instance, suitable channels 100 include, but are not limited to, pores, tunnels, holes, conduits, nanowire meshes, wire meshes and screens.

The anode current collector 72 surrounds the separator 90 and the cathode current collector 74. The separator 90 surrounds the cathode current collector 74. In some instances, the cathode current collector 74 is positioned in the interior channel 70 and surrounds at least a portion of the interior channel 70 as illustrated in FIG. 3A and FIG. 3B. For instance, the cathode current collector 74 can surround the longitudinal axis of the electrolytic cell 42.

The cathode precursor includes multiple channels 102 that allow the second fuel product to flow from the membrane 68 and through the cathode current collector 74 into the interior channel 70 of the electrolytic cell 42 where the second fuel product can flow to the second fuel vent 54 where the second fuel product can exit the reactor reservoir 40 and the housing. Although the channels 102 are illustrated as openings through the cathode current collector 74, the channels 102 can have a variety of forms and can have one or more features selected from the group consisting of straight, branched, tortuous, curved, twisted and bent. For instance, suitable channels 102 include, but are not limited to, pores, tunnels, holes, conduits, nanowire meshes, wire meshes and screens.

The separator 90 can be smooth and in continuous contact with the anode current collector 72 and the cathode current collector 74 as illustrated in FIG. 1B. Alternately, the separator 90 can be folded or bent into arrangements that include alternated ridges and grooves such as corrugated and pleated arrangements as illustrated in FIG. 3B. The folded or bent arrangements can pleats multiple points of contact between the separator 90 and the anode current collector 72 and also multiple points of contact between the separator 90 and the cathode current collector 74. The multiple points of contact provided by the pleats may be advantageous over the continuous contact provided by separator 90 of FIG. 1B. Although not illustrated in FIG. 3B, the membrane 68 of FIG. 3B can have the oxidation catalyst layer 92, reduction catalyst layer 94, and separator 90 construction disclosed in the context of FIG. 1B.

Figure 3B:
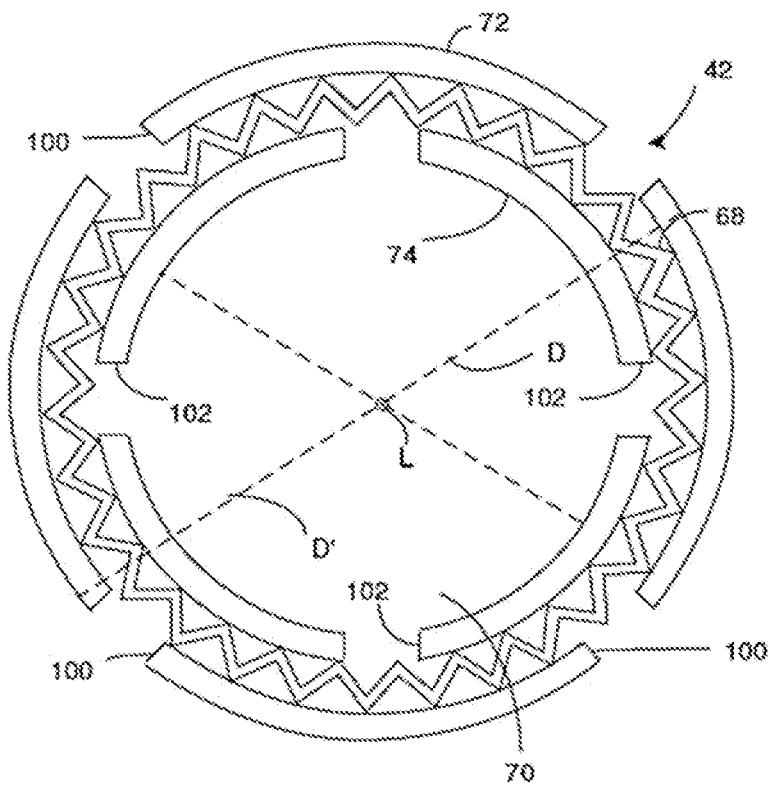
FIG. 3B is a cross section of an electrolytic cell suitable for use in the electrolyzer of FIG. 3A.
Figure 3C:
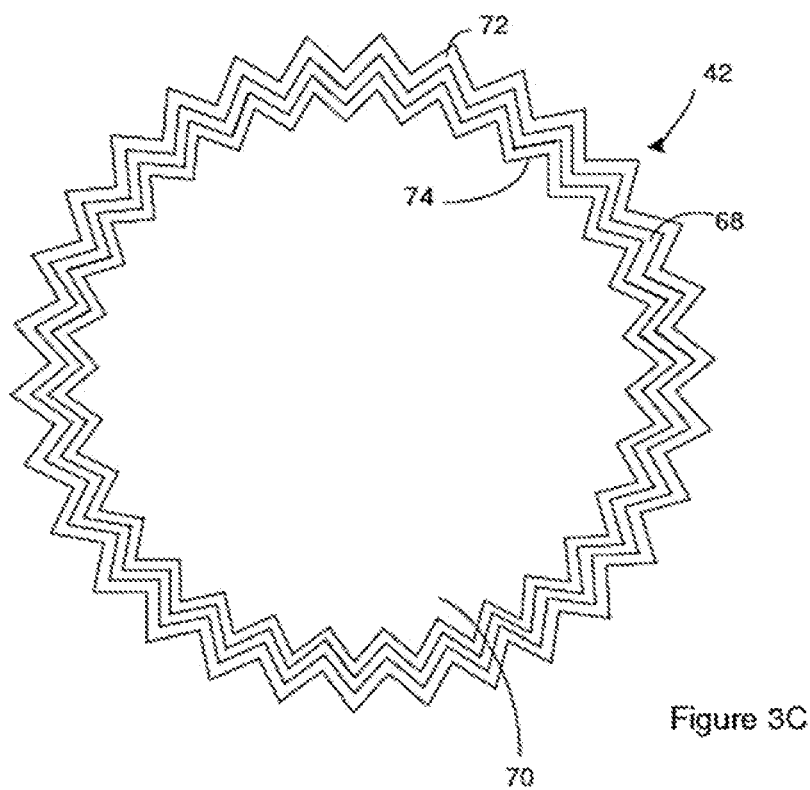
FIG. 3C is a cross section of an electrolytic cell suitable for use in the electrolyzer of FIG. 3A.

The anode current collector 72 and the cathode current collector 74 of FIG. 3B are shown as spaced apart from the membrane at multiple locations around the membrane. However, the anode current collector 72 and/or the cathode current collector 74 can be conformed to the membrane as illustrated in FIG. 3C. As a result, the contact between the anode current collector 72 and the membrane can be continuous and/or the contact between the cathode current collector 72 and the membrane can be continuous. The channels 100 and the channels 102 are optional and are not shown on the anode current collector 72 and the cathode current collector 74 of FIG. 3B but can be present.

The current collectors illustrated in the electrolytic cells of FIG. 3B and FIG. 3C can be broken into smaller current collectors as disclosed in the context of FIG. 1E. As a result, the membrane can surround one or more cathode current collectors that are in electrical communication with one another and/or one or more anode current collectors can contact an external surface of the membrane.

The membrane of an electrolytic cell constructed as disclosed in the context of FIG. 3A through FIG. 3C can be removed from and/or replaced in the electrolyzer as disclosed in the context of FIG. 2. Additionally or alternatively, an electrolytic cell constructed as disclosed in the context of FIG. 3A through FIG. 3C can be removed from and/or replaced in the electrolyzer as disclosed in the context of FIG. 2.

Suitable configurations for the above current collectors (anode current collectors and cathode current collectors) include, but are not limited to, configurations that have none, one two, or three features selected from a group consisting of solid, continuous, and one-piece construction, such as strips, coating, films, sheets of material, blocks, and plates. However, the anode current collector and/or the cathode current collector can have porous and/or open configurations including, but not limited to, woven electrical conductors, woven electrically conducting fabrics, mats and meshes of electrical conductors, meshes, screens, porous materials, nanowire meshes, screen printed meshes, and porous nanoparticle thin films. As a results, the anode current collectors 72 and/or the cathode current collectors 74 illustrated FIG. 1A through FIG. 3C can represent woven electrical conductors, woven electrically conducting fabrics, mats and meshes of electrical conductors, meshes, screens, porous materials, nanowire meshes, screen printed meshes, and porous nanoparticle thin films.

The diameter and/or width of the interior channel is labeled D in FIG. 3B. In some instances, the diameter and/or width of the interior channel is greater than 1 micron, 10 microns, 100 microns, 1 mm, 1 cm, or 10 cm and/or less than 1 meter, 100 cm, 10 cm or 1 cm. The diameter and/or width of the membrane is labeled D' in FIG. 3B. In some instances, the diameter and/or width of the membrane is greater than 10 nm, 100 nm, 1 micron, 10 microns, or 100 microns and/or less than 20 nm, 200 nm, 1 microns, 20 microns, 100 microns, or 1 mm.

Figure 4A:
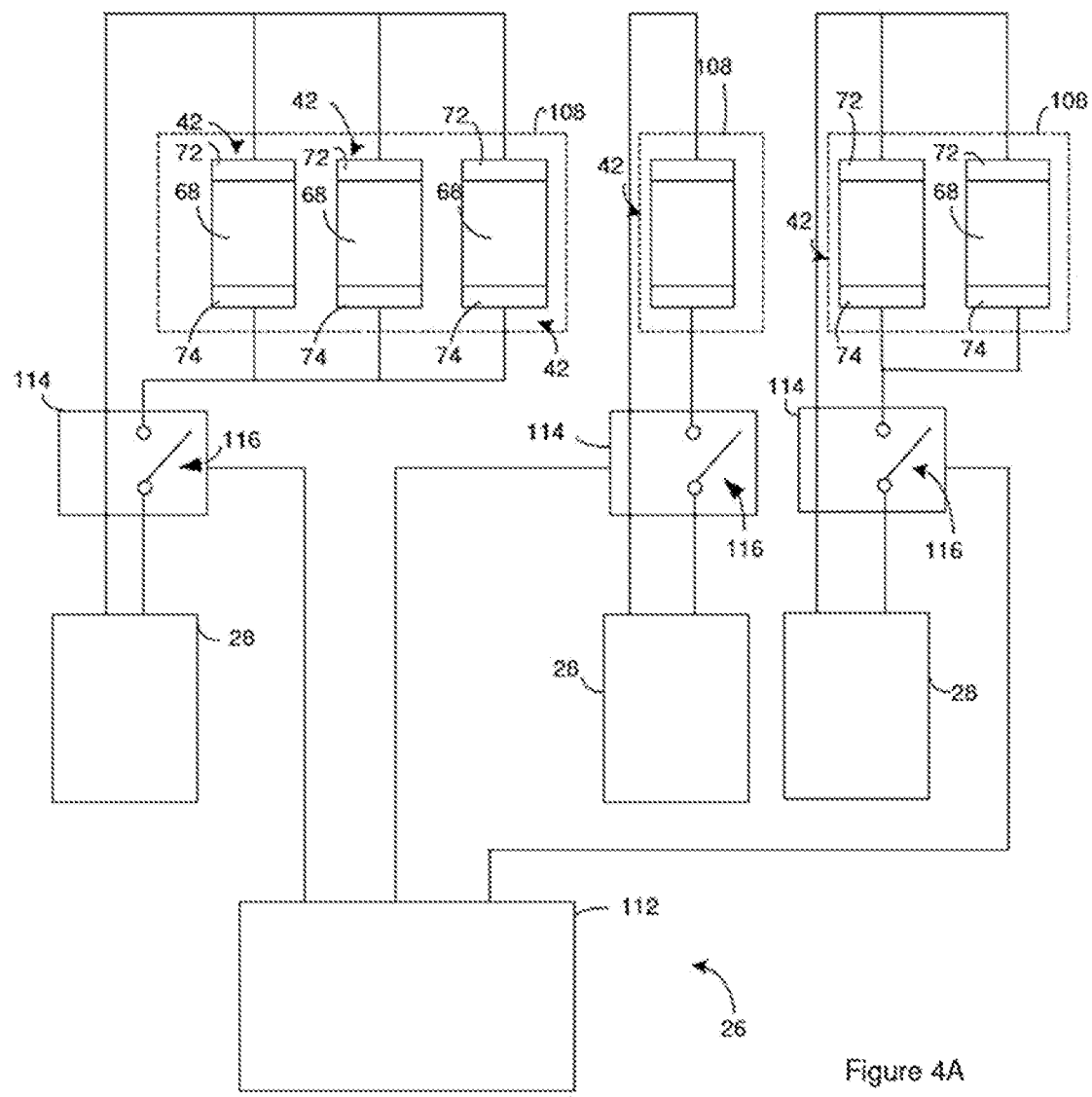
FIG. 4A illustrates electronics connecting electrolytic cells in cell selections where different cell selections receive electrical energy from different electrical energy sources.

When the electrolyzer includes multiple electrolytic cells 42, the electrolytic cells 42 can be divided into cell selections 108 where each cell selection 108 includes one or more electrolytic cells 42. The electronics 26 can connect each of the cell selections 108 to a different electrical energy source 28. For instance, FIG. 4A is a schematic of the electrical connections between six electrolytic cells 42 included in an electrolyzer. The electrolytic cells 42 are divided into three cell selections 108. The electronics 26 connect each of the different cell selections 108 with a different electrical energy source 28. For instance, each cell selection 108 is in electrical communication with a connection component 114 that is configured to provide electrical communication between the electrical energy source 28 and the electrolytic cells 42 in the cell selection 108 connected to that connection component 114. The electronics 26 include a controller 112 that is configured to operate the connection component 114. For instance, the illustrated connection components 114 each include a switch 116 that the controller 112 can open or close. When the electronics 26 close the switch 116, the electrical energy source 28 and the associated cell selection 108 are connected such that electrical energy output from the electrical energy source 28 is applied to each of the electrolytic cells 42 in the cell selection 108. When the electronics 26 open the switch 116, the electrical energy source 28 and the associated cell selection 108 are electrically disconnected.

In some instances, the connection components 114 include one or more electrical components as an alternative or in addition to the switch 116. The additional electrical components can operate on the electrical energy output from the electrical energy source 28 such that the electrical energy is applied to the electrolytic cells 42 with the desired characteristics. For instance, the connection components 114 can include a transformer (not shown) that provides the electrical energy that is applied to each of the electrolytic cells with the desired voltage. Additionally or alternatively, the connection components 114 can include a rectifier for situations where the associated electrical energy source outputs an alternating current. The rectifier can be configured to operate on the electrical energy from the electrical energy source such that the electrical energy provided to the electrolytic cells in the cell selection is Direct Current (DC) power. The additional electrical components can operate on the electrical energy output from the electrical energy source 28 so as to protect the electrical energy source 28. Examples of other components that can be included in the connection components 114 include, but are not limited to, current and voltage stabilizers and impedance matching electronics such as and maximum power point trackers to optimally utilize solar panel electrical output.

Figure 4B:
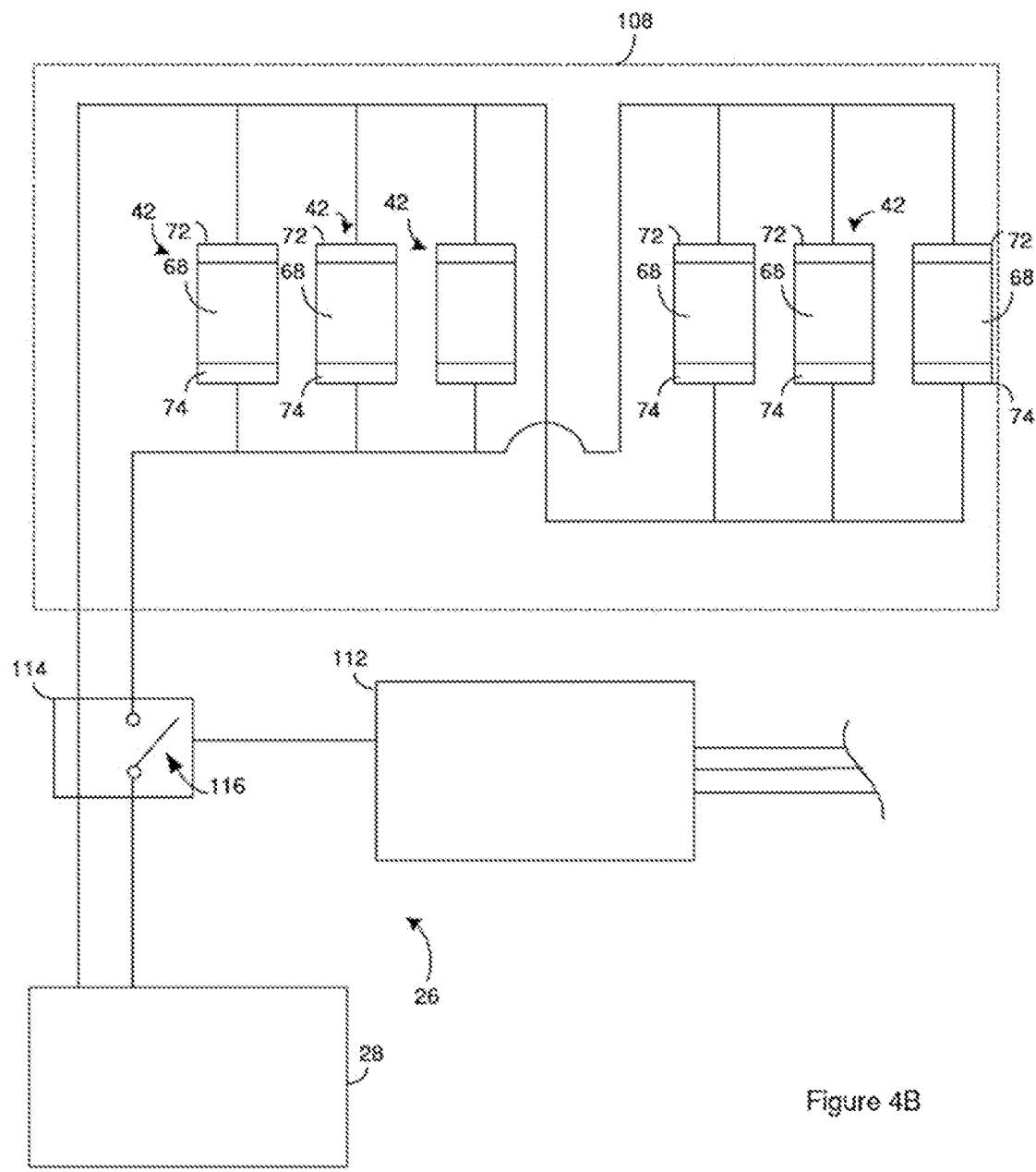
FIG. 4B illustrates electronics connecting a cell selection where different electrolytic cells are connected in an anti-parallel arrangement.

Each of the cell selections 108 illustrated in FIG. 4A has the electrolytic cells 42 connected in parallel. However, the cell selections 108 can connect the electrolytic cells 42 in other arrangements. For instance, the electronics 26 can connect the electrolytic cells 42 in a cell selection 108 such that one or more electrolytic cells 42 from the cells selection 108 is connect anti-parallel to one or more other electrolytic cells 42 from the cell selection 108. As an example, FIG. 4B illustrates a cell selection 108 that includes six electrolytic cells 42 where three first electrolytic cells 42 are in an antiparallel arrangement with three second electrolytic cells 42. The first electrolytic cells 42 are connected in parallel and the second electrolytic cells 42 are connected in parallel. When the electrical energy applied to the electrolytic cells 42 is an alternating current (AC), the electrolytic cells 42 each act as rectifier due to the intrinsic response of the impedance of the electrolysis process. As a result, the first cells conduct current from a first half cycle of the alternating current but not from the second half cycle of the alternating current. Since the first cells see current from one half of the alternating current cycle, a Direct Current (DC) is effectively applied to the first cells. In contrast, the second cells conduct current from the second half cycle of the alternating current half cycle but not from the first half of the alternating current half cycle. Since the second cells see current from one half of the alternating current cycle, a Direct Current (DC) is effectively applied to the second cells. Since a direct current is effectively applied to the electrolytic cells 42 of the cell selection 108 despite an alternating current being applied to the electrolytic cells 42, the electrical energy source 28 can be an alternating current electrical energy source 28 without the need for a rectifier in the associated connection component 114 and/or elsewhere in the pathway that the electrical energy travels from the electrical energy source to the electrolytic cell. Examples of suitable alternating current electrical energy sources 28 include, but are not limited to, wind driven turbines, grid connections, nuclear power plant output, and rotating machinery.

A suitable controller 112 for use in the electronics 26 includes or consists of analog electrical circuits, digital electrical circuits, processors, microprocessors, digital signal processors (DSPs), Application Specific Integrated Circuits (ASICs), computers, microcomputers, or combinations suitable for performing the operation, monitoring and control functions described above. In some instances, the controller 112 has access to a memory that includes instructions to be executed by the controller 112 during performance of the operation, control and monitoring functions. Although the electronics are illustrated as a single component in a single location, the electronics can include multiple different components that are independent of one another and/or placed in different locations.

One or more of the housing sections is optional. For instance, the electrolyzer need not includes one or more housing selections selected from the cap container 10, the electronics case 14, the temperature control case 16, the purification case 18, and the fuel precursor container 20. Additionally, components within the housing can be re-arranged. For instance, the electronics 26 can be located in the cap container 10 and the electrolyzer can exclude the electronics case 14.

Although the electrolyzer is disclosed in the context of water serving as the fuel precursor, the electrolyzer can be used with other fuel precursors. As a result, the electrolyzer can be used to generate fuel products other than oxygen and/or hydrogen. For instance, the electrolyzer can be configured to generate CO, methanol, ammonia, alcohols and/or hydrocarbons. As a result, the electrolyzer may generate only one of the fuel products and/or a fuel product generated by the electrolyzer might not be desirable and can be discarded. Accordingly, the second fuel product or the first fuel product may be the only fuel product generated by the electrolyzer.

Although the electrolytic cells 42 are disclosed as having an anode on an exterior of the membrane 68 and a cathode on an interior of the cathode membrane 68, the polarity of the electrolytic cells 42 can be reversed. For instance, the cathode current collector 74 can be traded with the cathode current collector 74 and the oxidation catalyst layer 92 can be traded with the reduction catalyst layer 94. Additionally or alternately, the electrolyzer can be configured such that the fuel precursor flows through the interior channels 79 of the electrolytic cells 42 and the second fuel product flows around the exteriors of electrolytic cells 42.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An electrolyzer, comprising:
a housing having an inlet port, a first outlet port, and a second outlet port;
a plurality of electrochemical cells disposed in the housing, each of the plurality of electrochemical cells including:
a non-planar membrane and a catalyst, the non-planar membrane being formed from a non-ceramic material, the non-planar membrane configured to inhibit transport of gases,
a first current collector disposed on a first side of the non-planar membrane,
a second current collector disposed on a second side of the non-planar membrane, the second side opposite the first side, and
the non-planar membrane of each of the plurality of electrochemical cells being independently removable from the electrolyzer by axially sliding the respective non-planar membrane relative to corresponding first and second current collectors until the respective non-planar membrane is removed from between the corresponding first and second current collectors;
a fuel precursor disposed in the housing and in contact with the non-planar membrane;
an energy source electrically coupled to the electrochemical cell, the energy source configured to apply a bias to the electrochemical cell.

2. The electrolyzer of claim 1, wherein:
the first current collector defines a first plurality of apertures to allow the fuel precursor to flow through the first current collector to the non-planar membrane, and
the second current collector defines a second plurality of apertures to allow a product to flow from the membrane through the second current collector.

3. The electrolyzer of claim 2, wherein the first plurality of apertures are radially offset from the second plurality of apertures.

4. The electrolyzer of claim 1, further comprising:
electronics electrically coupled to the electrochemical cell and the energy source, the electronics configured to control the bias applied to the electrochemical cell.

5. The electrolyzer of claim 4, wherein the electronics are configured to apply an alternating current ("AC") cycle to each of the plurality of electrochemical cells, each of the plurality of electrochemical cells forming two electrochemical half cells that receive a respective half cycle of the AC cycles such that a direct current ("DC") is effectively applied to each of the plurality of electrochemical cells.

6. The electrolyzer of claim 1, wherein:
the inlet port is configured to allow the fuel precursor to flow into the housing,
the first outlet port is configured to allow a first product generated by the electrochemical cell to flow out of the housing, and
the second outlet port is configured to allow a second product generated by the electrochemical cell to flow out of the housing.

7. The electrolyzer of claim 6, wherein the fuel precursor is liquid water, the first product is gaseous oxygen, and second product is gaseous hydrogen.

8. An electrolyzer, comprising:
a housing having an inlet port, a first outlet port, and a second outlet port;
an electrochemical cell disposed in the housing, the electrochemical cell including a non-planar membrane including a catalyst, the non-planar membrane being formed from a non-ceramic material, the non-planar membrane being pleated or corrugated, the non-planar membrane configured to inhibit transport of gases; and
an energy source electrically coupled to the electrochemical cell and configured to apply a bias to the electrochemical cell.

9. The electrolyzer of claim 8, wherein the electrochemical cell further comprises:
a first current collector disposed on a first side of the non-planar membrane; and
a second current collector disposed on a second side of the non-planar membrane, the second side opposite the first side.

10. The electrolyzer of claim 9, wherein the membrane is tubular and defines an inner channel.

11. The electrolyzer of claim 10, wherein a plurality of the electrochemical cells are disposed in the housing, and each of the plurality of electrochemical cells are independently removable from the housing.

12. The electrolyzer of claim 11, further comprising:
electronics configured to monitor each of the plurality of electrochemical cells and identify individual electrochemical cells that require maintenance.

13. The electrolyzer of claim 9, wherein:
the first current collector defines a first plurality of apertures to allow the fuel precursor to flow through the first current collector to the non-planar membrane, and
the second current collector defines a second plurality of apertures to allow a product to flow from the membrane through the second current collector.

14. The electrolyzer of claim 13, wherein the first plurality of apertures are radially offset from the second plurality of apertures.

15. An electrolyzer, comprising:
a housing including an inlet port, a first outlet port, and a second outlet port;
an electrochemical cell including:
a non-planar membrane including a catalyst, the non-planar membrane being formed from a non-ceramic material and configured to inhibit transport of gases,
a first current collector disposed on a first side of the membrane, the first current collector defining a first plurality of apertures to allow the fuel precursor to flow through the first current collector to the non-planar membrane, and
a second current collector disposed on a second side of the membrane, the second side opposite the first side, the second current collector defining a second plurality of apertures to allow a product to flow from the membrane through the second current collector, the second plurality of apertures being radially offset from the first plurality of apertures such that no portion of a flow path defined by a first aperture of the plurality of first apertures overlaps with a corresponding flow path defined by a second aperture of the plurality of second apertures;

a fuel precursor disposed in the housing and in contact with the non-planar membrane; and an energy source electrically coupled to the electrochemical cell and configured to apply a bias to the electrochemical cell.

16. The electrolyzer of claim 15, wherein at least one of the oxidation catalyst or the reduction catalyst is a non-platinum catalyst.

17. The electrolyzer of claim 16, wherein at least one of the oxidation catalyst or the reduction catalyst does not include $IrO_2$ or $RuO_2$.

18. The electrolyzer of claim 17, wherein the oxidation catalyst includes an oxide of at least two metals.

19. The electrolyzer of claim 18, wherein the oxidation catalyst includes at least one of $Ni_xMn_uSb_vO_w$, $Co_xMn_uSb_vO_w$, $Co_uSb_vO_w$, $Mn_uSb_vO_w$, $Ru_xSb_yO_z$, FeNi oxyhydroxide, Fe lanthanates, or inorganic perovskites.

20. The electrolyzer of claim 15, wherein the reduction catalyst includes at least one of a metal phosphide or a metal sulfide.

21. The electrolyzer of claim 20, wherein the reduction catalyst includes at least one of CoP, $CoP_2$, FeP, $FeP_2$, $MoS_2$, or MoPS.

22. The electrolyzer of claim 15, wherein the reduction catalyst includes at least one of NiMo, NiCo, Co(II) complexes with macrocyclic ligands, Fe(II) complexes with macrocyclic ligands, or Fe—S complexes that resemble metalloenzymes.

23. The electrolyzer of claim 15, wherein the non-planar membrane is tubular and defines an inner channel.

24. The electrolyzer of claim 15, wherein the non-planar membrane is corrugated or pleated.

25. An electrolyzer, comprising:

a housing having an inlet port, a first outlet port, and a second outlet port;

an electrochemical cell disposed in the housing, the electrochemical cell including:

a non-planar membrane, the non-planar membrane including a separator formed of a non-ceramic material, an oxidation catalyst layer disposed on an outer surface of the separator, and a reduction catalyst layer disposed on an inner surface of the separator opposite the outer surface, the non-planar membrane configured to inhibit transport of gases, a first current collector disposed on a first side of the non-planar membrane corresponding to the outer surface, and a second current collector disposed on a second side of the non-planar membrane corresponding to the inner surface;

an occluding structure disposed in an internal volume defined by the housing, the occluding structure defining an aperture through which the electrochemical cell is disposed along a longitudinal axis of the housing, the occluding structure dividing the internal volume of the housing into a first portion and a second portion, the second portion fluidically isolated from the first portion, a gap being defined between the non-planar membrane and at least one of the first current collector or the second current collector, the occluding structure including a projection extending axially into a portion of the gap, the projection contacting one of the first current collector or the second current collector to secure the non-planar membrane in the aperture; and an energy source electrically coupled to the electrochemical cell, the energy source configured to apply a bias to the electrochemical cell.

26. The electrolyzer of claim 25, wherein:

the inlet port fluidically is coupled to the first portion of the internal volume and configured to communicate a fuel precursor to the first portion, the first outlet port is fluidically coupled to the first portion of the internal volume and configured to receive a first fuel product produced at the oxidation catalyst layer of the electrochemical cell, and the second outlet port is fluidically coupled to the second portion of the internal volume and configured to receive a second fuel product produced at the reduction catalyst layer of the electrochemical cell.

27. The electrolyzer of claim 26, wherein the first current collector defines a first plurality of apertures to allow the fuel precursor to flow from the inlet port, through the first current collector, and to the non-planar membrane, and to allow the first fuel product to flow from the oxidation catalyst layer, through the first current collector, and to the first outlet port, and the second current collector defines a second plurality of apertures to allow the second fuel product to flow from the reduction catalyst layer, through the second current collector, and to the second outlet port.

* * * * *